United States Patent [19]

Lewis

[11] Patent Number: 4,751,441
[45] Date of Patent: Jun. 14, 1988

[54] TRANSDUCER POSITION CONTROL SYSTEM FOR DISK STORAGE EQUIPMENT

[75] Inventor: Martyn A. Lewis, Pacific Palisades, Calif.

[73] Assignees: Cambrian Consultants, Inc., Calabasas, Calif.; DRI Holdings Limited, Middlesex, England

[21] Appl. No.: 739,880

[22] Filed: May 31, 1985

[51] Int. Cl.$^4$ .............. H01R 39/46; H02K 13/00; H02P 1/00

[52] U.S. Cl. .......................... 318/439; 318/561; 318/594; 318/603

[58] Field of Search .............. 318/561, 590, 594, 592, 318/603, 254 A, 254, 439; 360/78

[56] References Cited

U.S. PATENT DOCUMENTS

| | | | |
|---|---|---|---|
| 3,663,877 | 5/1972 | Clark | 318/326 |
| 3,969,663 | 7/1976 | Arthur | 318/561 |
| 4,031,443 | 6/1977 | Droux | 318/561 |
| 4,379,256 | 4/1983 | Maury | 318/561 |
| 4,383,209 | 5/1983 | Lewis | 318/561 X |
| 4,396,959 | 8/1983 | Harrison | 360/77 |
| 4,419,701 | 12/1983 | Harrison | 360/77 |
| 4,430,698 | 2/1984 | Harris | 318/561 X |
| 4,439,800 | 3/1984 | Powell | 318/561 X |
| 4,459,525 | 7/1984 | Hasegawa | 318/561 |
| 4,469,993 | 9/1984 | Swanson | 318/561 |
| 4,473,786 | 9/1984 | Miyashita | 318/561 |
| 4,480,217 | 10/1984 | Robbins | 318/561 |
| 4,491,776 | 1/1985 | Veale | 318/561 |
| 4,558,265 | 12/1985 | Hayashida | 318/561 |

Primary Examiner—William M. Shoop, Jr.
Assistant Examiner—Patrick C. Keane
Attorney, Agent, or Firm—Bogucki, Scherlacher, Mok & Roth

[57] ABSTRACT

A method and apparatus are disclosed for positioning a transducing apparatus relative to a rotating storage medium through the use of an externally commutated positioning apparatus under control of a processing element. In addition, a control method is disclosed which includes an initial determination of salient parameters associated with the apparatus. Positioning of the transducing apparatus is achieved through a plurality of control modes which are responsive to the determined parameters. In addition, the accuracy with which position of the transducing apparatus is determined varies among the modes with the remaining distance yet to traverse to a desired destination position.

31 Claims, 10 Drawing Sheets

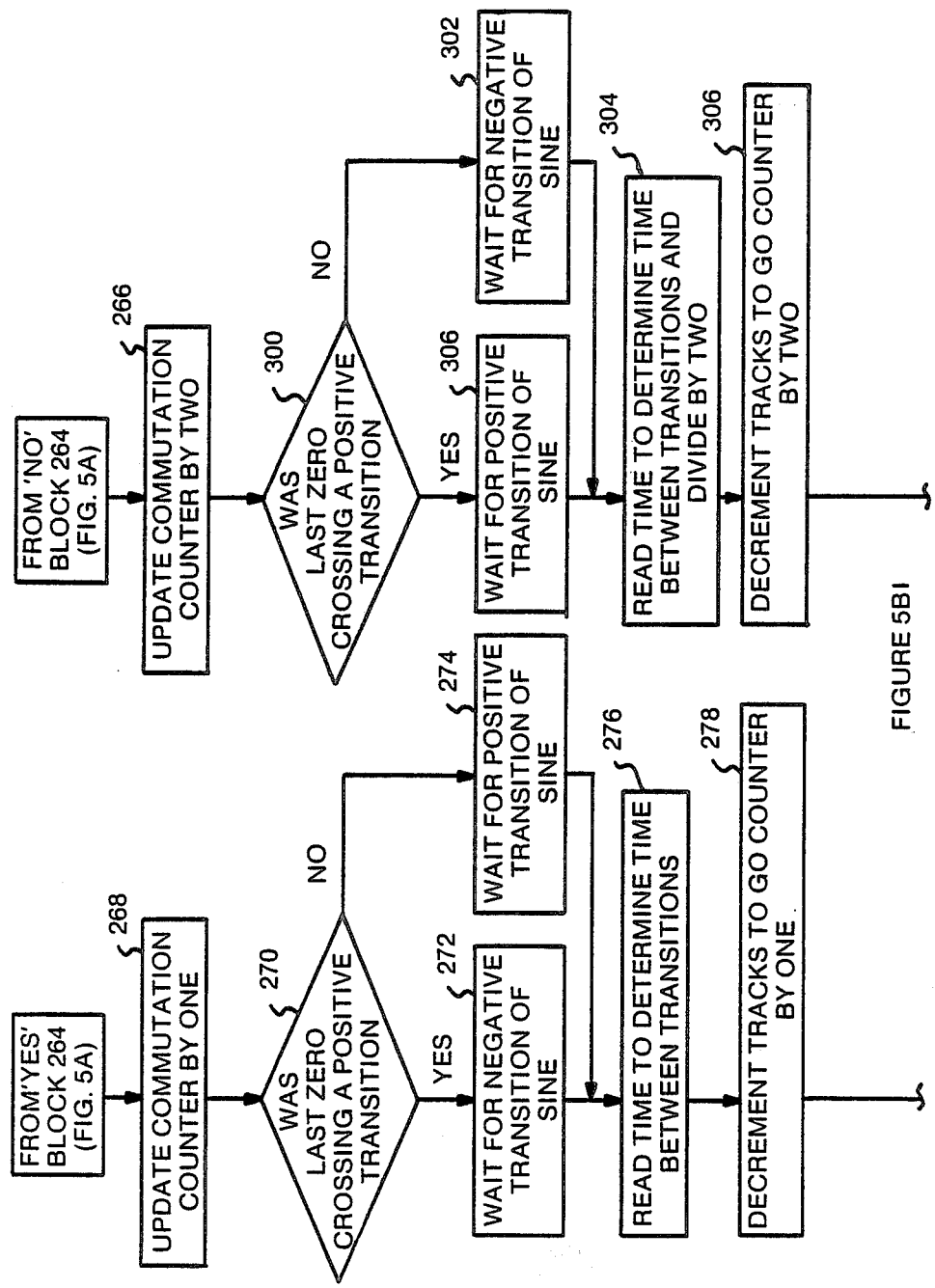
FIGURE 5B1

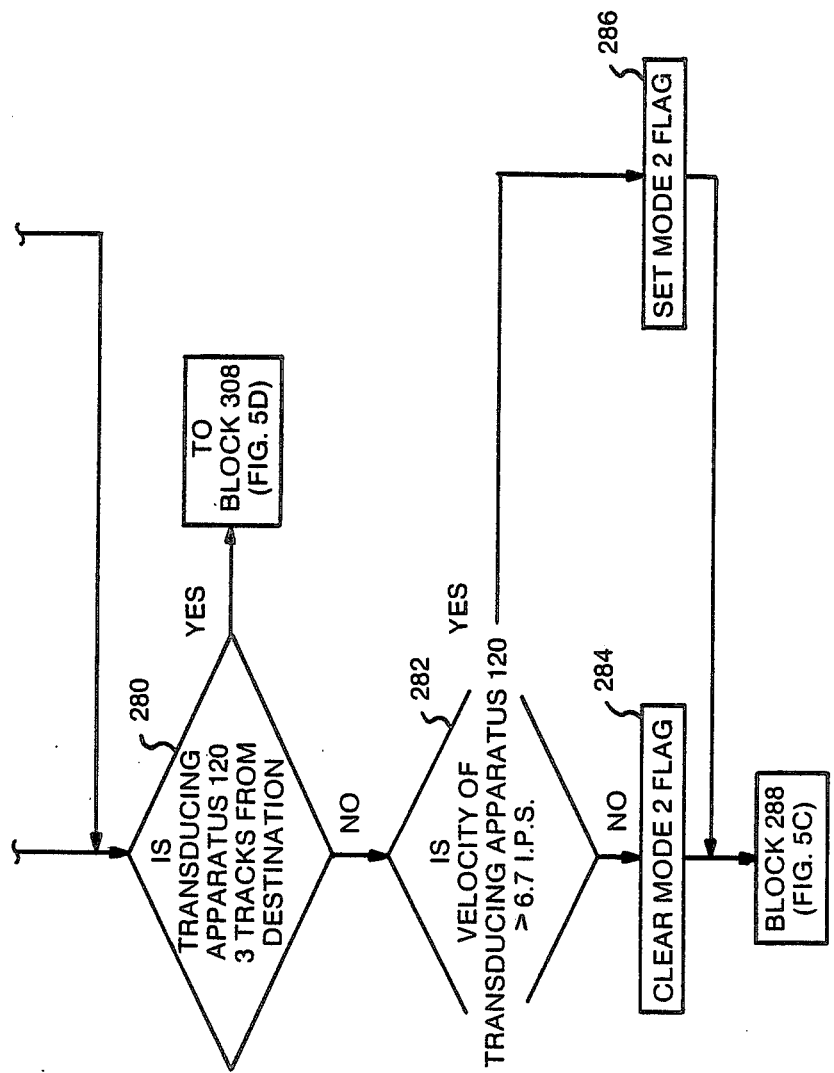

4,751,441

TRANSDUCER POSITION CONTROL SYSTEM FOR DISK STORAGE EQUIPMENT

BACKGROUND

This invention relates to electronic positioning devices, and more particularly to an improved apparatus and method for the positioning of transducing apparatus relative to a rotating storage medium.

In the past, there have been a wide variety of approaches taken to the positioning of transducing apparatus relative to a rotating disk storage medium. These approaches involve not only differing types of positioning schemes and associated apparatus, but also differing approaches to the control thereof. Positioning schemes have included linear-linear, rotary-rotary and rotary-linear techniques. Positioning apparatus typically employed have included stepper motors, voice coil actuators and non-commutated motors. Coupling between positioning apparatus and associated transducing apparatus has been both direct and indirect. While approaches to the control of positioning apparatus were originally analog in nature, more recent designs have been of a hybrid nature, employing both analog and digital techniques.

In the linear-linear positioning scheme, both the motion produced by a motor as well as the movement experienced by a transducing assembly relative to a rotating storage medium is rectilinear in nature. The motor and the transducing assembly may be coupled in either a direct or indirect manner. In the direct coupling arrangement, the motor is directly coupled to the transducing assembly in such a manner that there exist a one-for-one relationship between motion of the motor and motion of the transducing assembly. Such an arrangement has the advantage of producing an assembly which is quite rigid, having a high resonant frequency. However, the mechanical advantage of motion produced by the motor relative to that experienced by the transducing assembly is fixed, and consequently may not be optimized. As there is generally an optimal mechanical advantage in the design of such mechanical systems, a system of levers may be employed to maximize efficacy of the system. However, use of levers necessarily results in an indirectly coupled system. While an indirectly coupled system may provide for numerous advantages, including a method to maximize efficacy of the mechanical system as well as providing for a method to simplify position decoding through the use of encoding apparatus coupled to corresponding levers, such a system introduces a flexible member in the control train between the motor and the transducer assembly. Such flexible members, however, are undesirable due to the potential introduction of error in determining position of the transducer assembly.

In a rotary-rotary positioning scheme, both the motion produced by a motor as well as the movement experienced by a transducing assembly relative to a rotating storage medium is rotary in nature. The motor and the transducing assembly may be coupled in either a direct or indirect manner. In the direct coupling arrangement, the motor is directly coupled to the transducing assembly in such a manner that there exist a one-for-one relationship between motion of the motor and motion of the transducing assembly. Such an arrangement has the advantage of producing an assembly which is quite rigid having a high resonant frequency. However, the disadvantage of such a design is that the mechanical advantage of motion produced by the motor relative to that experienced by the transducing assembly is fixed, and as a result may not be optimized. In an alternate approach, a member is typically pivoted about a selected point with the transducing apparatus on one end, and the motor coupled to the other end. The distance between the pivot point and the two alternate ends of the member, i.e., the distance between the pivot point and the transducer assembly, and the distance between the pivot point and the point of coupling to the motor, may be selected in such a way to maximize the efficacy of the mechanical system.

In a rotary-linear positioning scheme, the motion produced by a motor is rotary in nature, and the movement experienced by a transducing assembly relative to a rotating storage medium is linear in nature. Due to the difference in the type of motion produced by the motor and the desired motion of the transducing assembly, the coupling between the two is necessarily indirect. Typical of such rotary-linear positioning schemes is the familiar band-drive system frequently employed in floppy disk based systems wherein a transducer assembly is moved in a radial fashion across a surface of a rotating disk by a flexible metal band which is coupled about a pulley affixed to a shaft of a motor. Rotation of the shaft of the motor consequently results in radial movement of the transducing assembly across the surface of the disk. By changing the diameter of the pulley, the efficacy of the mechanical system may be optimized.

Positioning apparatus employed with the foregoing positioning schemes have included stepper motors, voice coils and non-commutated motors. While stepper motors have found wide application as a positioning apparatus in various positioning schemes, positioning accuracy obtainable with a stepper motor is necessarily limited due to mechanical tolerances associated with the operation of stepper motors. Consequently, tracks on the storage media must be spaced far enough apart to allow for mechanical tolerances associated with the operation of the stepper motor actuator. While these tolerances may be acceptable in relatively inexpensive floppy disk based storage systems, such limitations are highly undesirable in hard disk based system where the primary emphasis is on storage capacity. Consequently the use of stepper motors is generally avoided as a positioning apparatus in a high capacity storage system due to the resulting limitations imposed on the storage capacity of the system.

Voice coils may alternately be employed to produce either rectilinear or rotational motion. However, notwithstanding the particular design thereof, the total displacement of the moving member of the voice coils used with positioning apparatus in disk systems in the past has been limited to the difference in length between that of the magnet and the length of the coil. Consequently, while voice coils do offer an advantage in speed in operation, the limited range of motion available therefrom is a limiting consideration.

A yet further alternate approach to the production of rotational motion in rotary-rotary and rotary-linear positioning schemes is found in the use of a D.C. motor. However, due to problems associated with the control of the commutation of such motors, commutation is generally not performed. Rather, the D.C. motor is typically operated over only a limited range of rotation; frequently less than 100 degrees. A number of disadvantages follow from such an approach. By limiting the amount of useable rotational displacement of the motor, larger diameter pulleys must be attached to the rotor of the motor to achieve increased amounts of linear displacements of the transducer apparatus assembly. This necessarily requires the use of larger amounts of space, which is often at a premium in high capacity storage systems. In further addition, by operating the motor over only a limited range of angular displacement, it is more difficult to achieve a match between the rotational inertia of the motor with the reflected inertia of the head assembly. As a result thereof, it is not possible to achieve the higher efficiencies with lower power dissipation which result from achieving an optimal match between the mass of the transducer apparatus assembly and that of the D.C. motor.

In addition to the foregoing, differing approaches have been taken to the control of the transducer positioning apparatus. In particular, analog techniques were first employed. However, numerous undesirable effects including variations in component tolerances resulting from environmental effects have resulted in a shift toward control circuity employing a hybrid of analog and digital techniques. Numerous hybrid approaches have been employed in positioning the transducer assembly, with varying degrees of digital control. Typical of such approaches is a hybrid approach described in U.S. Pat. No. 4,396,959 to Harrison et al. wherein transducer apparatus position information is processed using analog apparatus including analog peak detectors and sample and hold circuits, and wherein digital position control information is converted to an analog format and subsequently processed with analog summing circuits and loop compensation networks. Further hybrid signal processing techniques may be found in U.S. Pat. No. 4,419,701 to Harrison et al. wherein analog position information is processed with an analog peak detector circuit, and wherein position control information is converted from a digital format to an analog format for processing by analog summing circuits and loop compensation networks. While such approaches do offer varying degrees of improvements in the process of transducer apparatus position determination and control, the disadvantages present with the use of analog techniques are still present to varying degrees.

Apart from hybrid hardware designs employing both analog and digital techniques, numerous control techniques have been employed with respect to controlling the position of the transducer apparatus. Such techniques have exhibited varying degrees of accuracy in controlling the position of transducer apparatus. In one control algorithm more fully described in U.S. Pat. No. 4,419,701 to Harrison el al., an open loop mode of operation is employed until the transducer apparatus is positioned at a desired destination track on the storage media, thereafter changing to a closed loop mode of operation. In other approaches where the positioning apparatus may operate in a closed loop mode, position information is determined at somewhat irregular intervals until such time as the transducer apparatus is positioned at a desired destination track. Consequently, varying degrees of reliability have been achieved in the past in the control of the positioning of transducer apparatus relative to a rotating storage medium.

From the foregoing it is clear that notwithstanding the use of differing positioning schemes, i.e., linear-linear, rotary-rotary and rotary-linear, achievement of optimal matching between the prime mover, i.e., the device producing motion, and a payload, e.g. a transducer assembly, may result in the use of some system of levers, thereby precluding advantages available from a direct coupling arrangement. This disadvantage in part results from the somewhat limited range of motion available from prime movers. Consequently, there is a need to provide for an increased range of motion by prime movers. In addition to the foregoing, there is a further need not only for more reliable approaches to the control of transducer apparatus, but also for more fully exploiting the advantages available from digital techniques in the implementation of such approaches.

SUMMARY

In accordance with the present invention, a method and apparatus are disclosed which provides for the positioning of transducing apparatus relative to a rotating disk storage medium by use of an externally commutated D.C. motor, with the control thereof being accomplished through the use of digital techniques. Broadly stated, the control techniques employed provide not only for the commutation of the D.C. motor, but further provide for complete control over the operation of the motor in the positioning of the transducing apparatus through the use of a plurality of operational modes, the selection therebetween being determined by the distance between the present position of the transducer apparatus and the desired position therefor. The operational modes include a Calibration Mode, a High Speed Mode, a Medium Speed Mode, a Transition Mode and a Detent Mode.

Operational parameters associated with the system are determined in the calibration mode. The parameters so determined are used to adjust commands issued to the system in subsequent modes to reflect the values of the parameters measured. Consequently, a significant degree of protection against both short and long term variations in system parameters is provided. The calibration mode provides for the determination of a number of parameters. In particular, the location of commutation positions of the motor are determined. This information is subsequently used to define points at which motor commutation will occur. In addition, as the operation of the motor is controlled through digital words coupled to motor windings through digital-to-analog converters and corresponding motor drive amplifiers, offset currents associated therewith are determined. Subsequent commands to the motor are then adjusted in such a manner as to compensate for the offset currents. In further addition, as position information of the transducer apparatus assembly is detected through the use of an optical sensor, the parameters associated therewith are measured and stored for later use. In particular, the transducer apparatus assembly is moved a selected amount, and series of corresponding maximum and minimum values of the signals from optical position transducers coupled thereto are measured to determine corresponding maximum and minimum values. Thereafter, a corresponding operational zero crossing point is determined from the determined maximum and minimum values, and used in subsequent position determining operations. In further addition, the location of a preselected track on the storage medium is determined. Subsequent positioning of the transducing apparatus assembly is thereafter done with respect to the location determined for this preselected track.

Broadly stated, subsequent to the receipt of a command to move the transducing apparatus assembly from a present position to a selected position, the difference between the current position of the transducing apparatus assembly and the selected position is determined. If the difference is greater than a first preselected distance, the High Speed Mode of operation is entered, by first entereing a Medium Speed Mode, and thereafter entering the High speed Mode, as more fully discussed hereinafter. In the High Speed Mode, position of the transducing apparatus is determined with respect to the location of every other track on the rotating disk medium. Relative velocity of the transducing apparatus assembly is thereafter determined from the measured positions and the time between the measurements. Commands to the motor are thereafter produced in response to both the determined velocity and the remaining distance between the current location of the transducer apparatus assembly and the desired location. In the High Speed Mode of operation, the transducer assembly is moved at a constant maximum velocity when the distance between the current position and the desired position of the transducer assembly is greater than a first preselected distance, and according to a table of decreasing velocities thereafter.

As the transducer apparatus approaches the desired position, and the corresponding velocity has decreased to a preselected velocity, a Medium Speed Mode of operation is employed wherein position of the transducing apparatus with respect to each track location is determined. As was the case in the High Speed Mode, the velocity of the transducer assembly is adjusted according to a table of velocities as a function of distance in such a fashion to continue to decrease the velocity of the transducer apparatus. In the Medium Speed Mode, the spatial frequency of the position determinations is increased as position of the transducing apparatus is determined with respect to the location of every track on the rotating disk medium. Relative velocity of the transducing apparatus assembly is thereafter determined from the measured positions and the time between the measurements. Commands to the motor are thereafter produced in response to both the determined velocity and the remaining distance between the current location of the transducer apparatus assembly and the desired location.

As the transducer apparatus continues to approach the desired position, and the distance between the current position of the transducer apparatus assembly and the desired position becomes less than a second preselected distance, a Transition Mode of operation is entered wherein position information is determined at a higher degree of accuracy than was the case in the High or Medium Speed Modes.

When the distance between the current position of the transducer apparatus assembly and the desired position is less than a third preselected distance, a Detent Mode is entered wherein a Position Integral Differentiation control approach is employed to position the transducing apparatus assembly to the desired location.

In this regard it should be noted that in accordance with the present invention, the accuracy with which a position of the transducing apparatus relative to the rotating disk medium is determined is increased as the distance between the current position of the transducing apparatus and the desired position decreases. In particular, in the High Speed Mode, position information is determined with respect to every other track the transducing apparatus crosses in moving toward the desired destination. Thereafter, in the Medium Speed Mode, position information is determined with respect to every track the transducing apparatus crosses. Thereafter, in the Transition Mode, position information is determined with greater accuracy than was the case in the High or Medium Speed Modes, i.e., with respect to individual positions across a track. Thereafter, in the Detent Mode, position information is monitored with yet further accuracy through the additional use of not only individual positions across a track, but further with respect to position information recorded on the disk.

In addition to the foregoing, commutation of the prime mover, i.e., the apparatus moving the transducing apparatus, is further performed at appropriate times as the transducing apparatus is advanced toward the desired destination position. Commutation of the prime mover is, however, suppressed at the destination position.

In addition to the foregoing, pre-recorded position information for each track on the storage medium is further employed in the Detent Mode, as previously referenced. In particular, each track on the storage medium has associated therewith pre-recorded position information from which the position of the transducing apparatus assembly with respect to a selected track may be determined. This pre-recorded track information is sampled on each revolution of the storage medium in the Dent Mode, and position information determined therefrom is employed in positioning of the transducing apparatus assembly with respect to the desired track.

DESCRIPTION OF THE FIGURES

FIGS. 5A thru 5E illustrates functional operations associated with the High Speed Mode, the Medium Mode, the Transition Mode and Detent Mode of operation.

DETAILED DESCRIPTION

In accordance with the present invention, a method and apparatus are disclosed which provide for an improved transducer position control system for disk storage equipment employing an externally commutated motor and digital control techniques.

Figure 1:
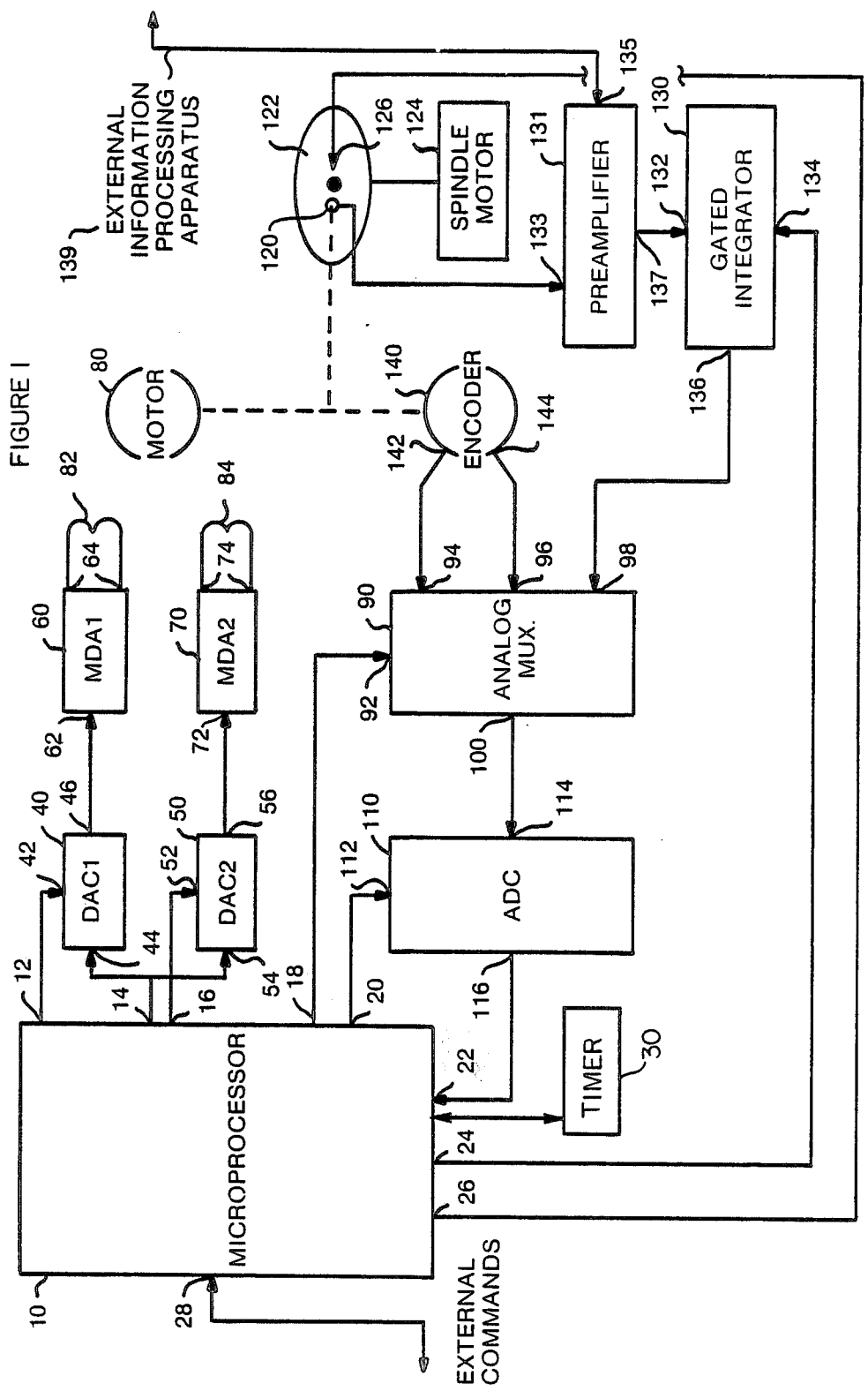
FIG. 1 is a broad functional block diagram of apparatus in accordance with the present invention.

FIG. 1 is a functional block diagram of apparatus in accordance with the present invention. Referring to FIG. 1, Microprocessor 10 functions as a central control element to orchestrate the operations of the transducer positioning apparatus, as will be more fully described hereinafter. Microprocessor 10 communicates with devices external thereto by information passing through a number of functional terminals associated therewith. Microprocessor 10 selects Digital-to-Analog Converter 40 for receipt of digital information placed on data bus terminal 14 by placing an appropriate signal on terminal 12. In a similar fashion, Microprocessor 10 selects Digital-to-Analog Converter 50 for receipt of digital information placed on data bus terminal 14 by placing an appropriate signal on terminal 16. Microprocessor 10 controls the operation of Analog Multiplexer 90 by control signals placed on terminal 18. Microprocessor 10 controls the operation of Analog-to-Digital Converter 110 by control signals placed on terminal 20. Microprocessor 10 receives information from Analog-to-Digital Converter 110 on terminal 22. Microprocessor 10 places control information for Gated Integrator 130 on terminal 24. Microprocessor 10 receives periodic angular position information defining a selected angular position of a disk 122 on terminal 26. Microprocessor 10 receives information from and communicates to other external devices by information coupled to terminal 28. It is understood that the foregoing discussion of particular terminals through which Microprocessor 10 communicates with other devices was in terms of functionality of the operations being performed; the exact nature and manner in which a particular type of microprocessor device would in fact accomplish the aforedescribed communication would be determined by the particular type of device selected, the details as to device interfacing being apparent to one of ordinary skill in the art. In the preferred embodiment, Microprocessor 10 was implemented by a model 6301 microprocessor manufactured by Hitachi Corporation of Tokyo, Japan. A timer 30 such as a conventional programmable timer is connected to microprocessor 10 to provide the positioning system with a timing capability. Alternatively, the timer could be an integral part of microprocessor 10.

Digital-to-Analog Converter 40 has associated therewith a select terminal 42, an input terminal 44 and an output terminal 46. Digital-to-Analog Converter 40, responsive to a select signal present on select terminal 42, and a digital word on terminal 44, functions to couple an analog value to terminal 46 having a magnitude proportional to the digital word coupled to terminal 44.

Digital-to-Analog Converter 50 has associated therewith a select terminal 52, an input terminal 54 and an output terminal 56, and functions in an identical manner as Digital-to-Analog Converter 40. While any of a wide variety of digital-to-analog converter devices may be used, a model AD7528 Dual Analog-to-Digital Converter manufactured by Analog Devices of Norwood, Mass. was used in the preferred embodiment to implement the functions of Digital-to-Analog Converters 40 and 50.

Motor 80 is a two pole, 2 phase D.C. motor having motor windings 82 and 84 associated therewith. In this regard it is to be understood that while a two pole, 2 phase externally commutated brushless D.C. motor was used in the preferred embodiment, and is illustrated in FIG. 1, other types of externally commutated positioning apparatus may likewise be employed, including externally commutated voice coil motors. In a similar fashion, while the externally commutated positioning apparatus was of a two pole design in the preferred embodiment, any number of poles could likewise be employed in accordance with the teachings of the present invention. Such other types of externally commutated positioning apparatus having a plurality of poles would be apparent to one of ordinary skill in the art and are to be considered to be within the teachings of the present invention.

Motor Drive Amplifier 60 has associated therewith input terminal 62 and output terminals 64, and functions responsive to an analog signal coupled to input terminal 62 to produce a corresponding analog output signal on output terminals 64 suitable for driving a winding of motor 80.

Motor Drive Amplifier 70 has associated therewith input terminal 72 and output terminals 74, and functions in an identical manner as Motor Drive Amplifier 60. While the functions of Motor Drive Amplifiers 60 and 70 may be implemented by any of a wide variety of devices, model L272 Dual Power Operational Amplifiers manufactured by SGS Semiconductor Corporation of Phoenix, Ariz. were employed in the preferred embodiment.

Analog Multiplexer 90 has associated therewith select terminal 92, analog input terminals 94, 96 and 98, and analog output terminal 100. Analog Multiplexer 90 responsive to a select signal coupled to select terminal 92 operates to couple an analog signal present on one of analog input terminals 94, 96 or 98 to analog output terminal 100. The particular analog input terminal which is coupled to analog output terminal 100 is determined by the signal coupled to select terminal 92. While the functions of Analog Multiplexer 90 may be implemented by any of a wide variety of analog multiplexer devices, a model 4051 Analog Multiplexer manufactured by National Semiconductor of Santa Clara, Calif. was used in the preferred embodiment.

Analog-to-Digital Converter 110 has associated therewith select terminal 112, analog input terminal 114 and digital output terminal 116, and functions responsive to a select signal coupled to select terminal 112 to convert the magnitude of the analog signal which is present on analog input terminal 114 to a corresponding digital value on digital output terminal 116. While the functions of Analog-to-Digital Converter 110 may be implemented by any of a wide variety of analog-to-digital devices, a model ADC0820 Analog-to-Digital Converter manufactured by National Semiconductor of Santa Clara, Calif. was used in the preferred embodiment of the present invention.

Disk 122 serves as a storage medium for information, and is rotated by Spindle motor 124. Transducer apparatus 120 functions to transfer information onto as well as retrieve information from the surface of disk 122. Transducer apparatus 120 is mechanically coupled to the rotor of Motor 80 in such a fashion that Transducer apparatus 120 may be moved relative to selected positions on the surface of disk 122 responsive to the rotation of the rotor of Motor 80. In this regard, it is understood that the movement of Transducer assembly 120 across the surface of Disk 122 may be according to either the linear-linear, rotary-rotary or rotary-linear positioning schemes, using either a direct or indirect coupling arrangements. In the preferred embodiment, Transducer assembly 120 was indirectly coupled to the rotor of Motor 80 by a standard band and pulley coupling apparatus, well known to one of ordinary skill in the art.

Preamplifier 131 has associated therewith terminals 133, 135 and 137, and operates in conjunction with Transducer apparatus 120 in the electrical coupling of information between Transducer apparatus 120, External Information Processing Apparatus 139 and Gated Integrator 130. In particular, Preamplifier 131 functions to transfer information between Transducer apparatus 120 and External Information Processing Apparatus 131, and from Transducer assembly 120 to Gated Integrator 130, as more fully described hereinafter. While any of a wide variety of preamplifier devices well known to one of ordinary skill in the art may be used, a model 501 Preamplifier manufactured by Silicon Systems, Inc of Tustin, CA., was used in the preferred embodiment.

Disk 122 has associated therewith Index Sensor 126 which functions to produce a signal once per revolution of Disk 122 responsive to the passage of a selected angular position thereby.

Gated Integrator 130 has associated therewith input terminal 132, control terminal 134 and output terminal 136, and operates responsive to a signal coupled to control terminal 134 to rectify and thereafter electrically integrate a signal coupled to input terminal 132, producing the corresponding output signal on output terminal 136, as will be more fully discussed hereinafter.

Encoder 140 is mechanically coupled to Motor 80, and consequently functions to provide information with respect to the position of transducer assembly 120 with respect to the surface of disk 122. In particular, responsive to the rotation of the shaft of Motor 80, Encoder 140 produces two periodic signals, one on terminal 142 and the other on terminal 144. The periodic signals are typically sine and cosine, or triangular waveforms displaced with respect to each other by ninety degrees. The signals produced by Encoder 140 are used to determine the relative position of Transducer apparatus 120 with respect to disk 122. In the preferred embodiment, each zero crossing of a selected signal from Encoder 140 defines the approximate location of a track on disk 122. As each of the signals produced by Encoder 140 typically has a relative linear and non-linear portion, both signals are typically employed for the accurate determination of position information. In particular, when a non-linear portion of one signal is encountered, the alternate signal is typically in the relatively linear portion, and is used for the determination of position information, as more fully discussed hereinafter. Consequently, by switching between the two signals as necessary, continuously accurate position information of Transducer assembly 120 with respect to the surface of Disk 122 may be determined. Encoder 140 may be any of a wide variety of encoding devices. The number of cycles of the periodic signals produced per revolution by Encoder 140 in response to rotation of the shaft of Motor 80 140 is referred to as the pitch. Typical pitches may be 1000 cycles per 360 degree rotation of the shaft of motor 80. In the preferred embodiment, Encoder 140 has a pitch of 600, and is manufactured by Computer Optical Products of Chatsworth, Calif.

The foregoing described apparatus is configured in the following manner. Terminal 12, 14, 16, 18, 20, 22 and 24 of Microprocessor 10 is coupled to terminal 42 of Digital-to-Analog Converter 40, terminals 44 and 54 of Digital-to-Analog Converters 40 and 50 respectively, terminal 52 of Digital-to-Analog Converter 50, terminal 92 of Analog Multiplexer 90, terminal 112 of Analog-to-Digital Converter 110, terminal 116 of Analog-to-digital Converter 116, and terminal 134 of Full Wave Rectifier and Gated Integrator 130, respectively. The signal from Index Sensor 126 is coupled to terminal 26 of Microprocessor 10. Microprocessor 10 communicates with respect to external positioning commands through terminal 28. Terminal 46 of Digital-to-Analog Converters 40 is coupled to terminal 62 of Motor Drive Amplifier 60. Terminals 64 of Motor Drive Amplifier 60 are coupled to winding 82 of motor 80. In a similar fashion, terminal 56 of Digital-to-Analog Converter 50 is coupled to terminal 72 of Motor Drive Amplifier 70. Terminals 74 of Motor Drive Amplifier 70 are coupled to winding 84 of Motor 80. Terminals 142 and 144 of Encoder 140 are coupled to terminals 94 and 96, respectively, of Analog Multiplexer 90. Transducer apparatus 120 is coupled to terminal 133 of Preamplifier 131. Preamplifier 131 communicates with External Information Processing Apparatus 139 through terminal 135. Terminal 137 of Preamplifier 131 is coupled to terminal 132 of Full Wave Rectifier & Gated Integrator 130. Terminal 136 of Full Wave Rectifier and Gated Integrator 130 is coupled to terminal 98 of Analog Multiplexer 90.

Figure 2:
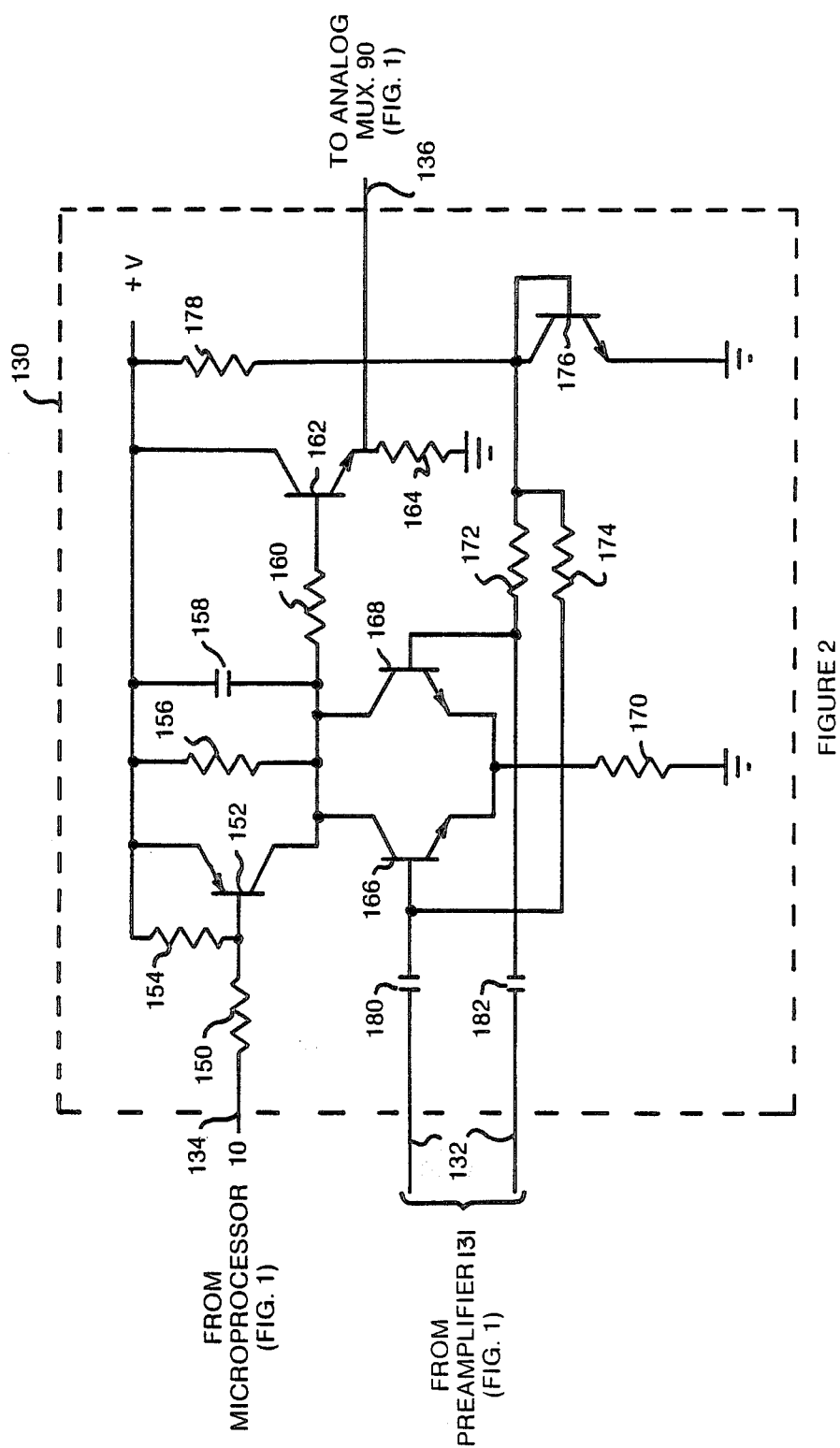
FIG. 2 is a schematic diagram of an implementation of a Gated Integrator employed in the present invention.

FIG. 2 illustrates the apparatus employed in the preferred embodiment to implement Gated Integrator 130. Referring to FIG. 2, resistor 150 couples the signal from terminal 24 of Microprocessor 10 to the base of transistor 152, and corresponds to terminal 134 of Gated Integrator 130 (FIG. 1). Resistor 154 couples the base of transistor 152 to the emitter thereof. Resistor 156 and capacitor 158 are coupled between the emitter and collector of transistor 152. Resistor 160 couples the collector of transistor 152 to the base of transistor 162. The emitter of transistor 152 and the collector of transistor 162 are coupled to a source of positive potential. The emitter of transistor 162 is coupled to a ground reference by resistor 164. The respective collectors of transistors 166 and 168 are both coupled to the collector of transistor 152, and the emitters of both transistors 166 and 168 are likewise coupled together. Resistor 170 couples the emitters of transistors 166 and 168 to a ground reference. The base of transistor 166 is coupled to the collector of transistor 176 through resistor 174, and the base of transistor 168 is coupled to the collector of transistor 176 through resistor 172. The collector of transistor 176 is coupled to a source of positive potential through resistor 178. The base of transistor 176 is coupled to the collector thereof. The emitter of transistor 176 is coupled to ground reference. The signal from transducer assembly 120 is coupled to the base of transistors 166 and 168 by coupling capacitors 180 and 182, and together correspond to terminal 132 of Gated Integrator 130 (FIG. 1). The emitter of transistor 162 is coupled to terminal 98 of Analog Multiplexer 90, and corresponds to terminal 136 of Gated Integrator 120 (FIG. 1).

The apparatus of FIG. 2 operates in the following manner. Responsive to a signal from terminal 24 of Microprocessor 10, transistor 152 operates to discharge capacitor 158. Thereafter, a signal from transducer assembly 120 operates to control the charging of capacitor 158 by the operation of transistors 166 and 168. The potential to which capacitor 158 charges is coupled to terminal 98 of Analog Multiplexer 90 by the emitter follower combination of transistor 162 and resistor 164. Consequently, subsequent to a signal from terminal 24 of Microprocessor 10, Gated Integrator 130 operates to electrically integrate the signal from transducer assembly 120, and couple the value thereof to Analog Multiplexer 90, where it is subsequently coupled to Microprocessor 10 through Analog-to-digital Converter 110, as more fully discussed hereinafter.

Figure 3:
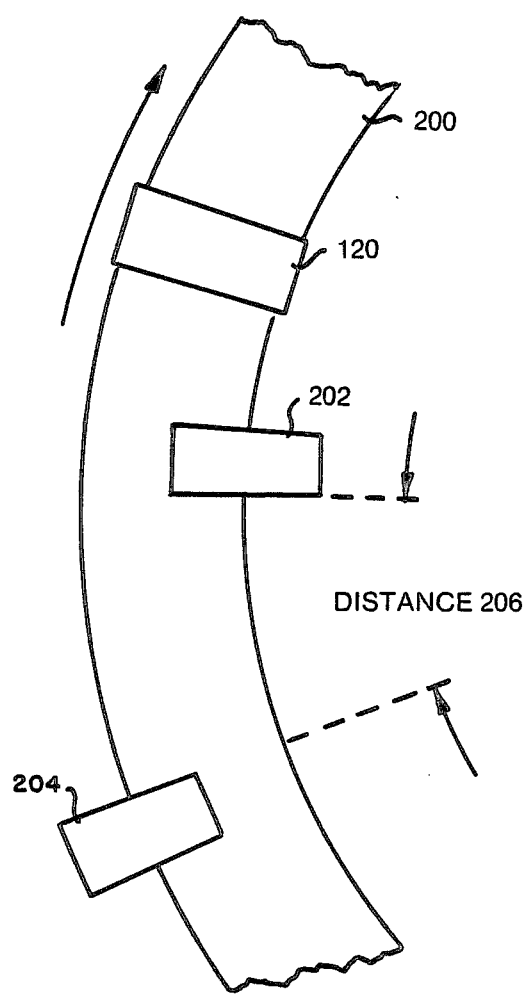
FIG. 3 illustrates positional information of servo bursts used in the present invention.

Information is typically stored across the surface of disk 122 in concentric bands referred to as tracks. Information used to define a precise track location is placed on each track, as illustrated in FIG. 3 with respect to a single track 200. Referring now to FIG. 3, a segment of a track 200 on the surface of Disk 122 is illustrated. For the purposes of the present discussion, it is assumed that Transducing apparatus 120 is positioned directly over track 200. Two discrete packets of information, referred to as servo bursts, are recorded on each track on the surface of disk 122, indicated as servo burst 202 and servo burst 204 in FIG. 3. Each of the discrete servo bursts 202 and 204 are positioned adjacent to and on opposite sides of the center of tract 200, and displaced from each other by a selected distance 206. As a result of the foregoing, each of servo bursts 202 and 204 will pass under transducer apparatus 120 at different points in time. The maximum amplitude of the resulting signal in transducer 120 in response to the passage of each of servo bursts 202 and 204 is measured by the operation of Gated Integrator 130, compared by Microprocessor 10, and used to correct the positioning of Transducer apparatus 120 with respect to track 200 in the following manner. If Transducer apparatus 120 is properly centered on track 200, the maximum amplitudes produced by servo burst 202 and 204 passing thereunder will be equal. However, if Transducing apparatus 120 is not correctly centered over track 200, there will be a difference in the maximum amplitudes produced by each of servo burst 204 and 206 when read by Transducer apparatus 120. The detection of a difference in amplitudes is thereafter used by Microprocessor 10 to properly position transducer assembly 120 with respect to track 200, as will be more fully discussed hereinafter.

The foregoing operates in the following manner. Referring once again to FIG. 1, Index Sensor 122 operates to produce a signal indicating the passage of a selected angular position on disk 122 thereby. This identified position serves as a reference position for information stored on individual tracks on disk 122. In particular, servo bursts 202 and 204 are recorded on disk 122 in such a fashion to pass under transducer 120 immediately following the passage of the reference position identified by the signal produced by Index Sensor 122. In operation, immediately subsequent to the receipt of the signal from Index Sensor 122 by Microprocessor 10 on terminal 26, Microprocessor 10 effects the resetting of capacitor 158 of Gated Integrator 130 (FIG. 2) by the generation of a signal to terminal 24 and coupled to terminal 136 of Gated Integrator. Thereafter, the signals produced in Transducer 120 (FIG. 3) by the passage of servo burst 202 thereunder and the subsequent integration thereof is coupled from Gated Integrator terminal 136 to Analog Multiplexer terminal 98. Microprocessor 10, by placing an appropriate signal on terminal 18 thereof effects the selection of the signal from Gated Integrator 130 for coupling to Analog-to-Digital Converter 110. Thereafter, in response to an appropriate signal from terminal 20 of Microprocessor 10 coupled to terminal 112 of Analog-to-Digital Converter 110, the magnitude of the amplitude of the signal produced by servo burst 202 will be converted to a corresponding digital value, and coupled to terminal 22 of Microprocessor 10. The foregoing process will then be repeated with respect to servo burst 204. Microprocessor 10 will thereafter compare the amplitudes resulting from the passage of servo bursts 202 and 204: equality of the two digital words indicating the correct positioning of transducer 120 (FIG. 2) over track 200, and inequality indicating incorrect positioning. Consequently, the position of transducer assembly 120 with respect to a track on Disk 122 may be precisely determined, and the position thereof subsequently corrected as necessary, as more fully described hereinafter. It will be understood in this regard that while the previously discussed zero crossing on a selected one of the signals produced by Encoder 140 is intended to identify the approximate location of tracks, the effect of a number of practical considerations results in a variation in the actual location of the tracks on the surface of Disk 122. In this regard it is recognized by those skilled in the art that thermal effects will result in the change of location of tracks on the surface of Disk 122. Consequently, the position information determined from the aforedescribed servo bursts is used to further qualify position information determined from the signals produced by Encoder 140, as will be more fully described hereinafter.

Figure 4A:
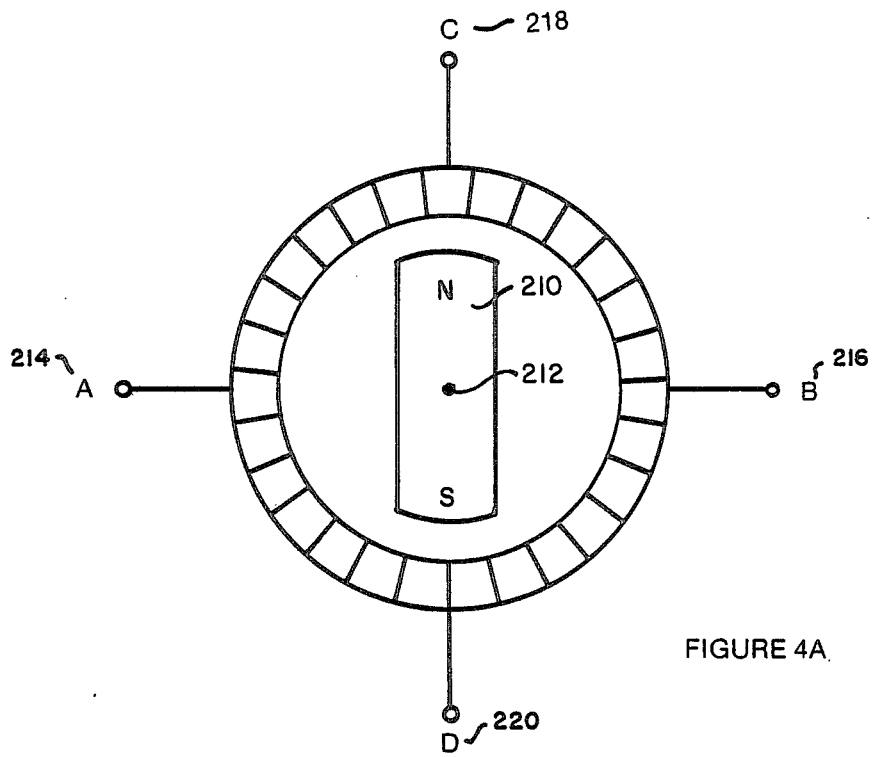
FIGS. 4A and 4B are broad functional illustrations of externally commutated motors capable of producing rotational and linear displacement of transducing apparatus in accordance with the present invention.

The position motor used in the preferred embodiment of the present invention is a two pole, two phase torquer motor, as functionally illustrated in FIG. 4A. Referring to FIG. 4A, a bar magnet 210 is positioned in the center of a circularly shaped magnetic permeable material, and pivoted for rotation at its center point 212. Terminals A 214 and B 216 represent terminals for windings about the circularly shaped magnetic permeable material. In particular, a first winding is wound around a first half, and a second winding about a second half of the circularly shaped magnetic permeable material, with the respective ends thereof connected to terminals A 214 and B 216. The windings are wound in such a manner that when a current is passed through the windings from terminal A 214 to terminal B 216, magnet 210 will rotate in a first direction approximately 90 degrees from an initial position approximately midway between the end points, i.e., terminal A 214 and B 216 of the windings. If the current is then reversed, magnet 210 will then rotate approximately 90 degrees in the opposite direction. In a similar fashion, terminals C 218 and D 220 likewise represent terminals for similar winding about the circular shaped magnetic permeable material, and are displaced from the previously discussed windings by 90 degrees. The windings connected to terminals C 218 and D 220 function in a similar manner: current in a first direction from terminal C 218 to terminal D 220 will result in rotation of magnet 210 approximately 90 degrees in a first direction from an initial position approximately midway between the end points, i.e., terminal C 218 and D 220, of the windings. If the current is then reversed, magnet 210 will then rotate approximately 90 degrees in the opposite direction. The first set of windings about the circularly shapped magnetic permeable material which connect to terminals A 214 and B 216 correspond to a single coil 82 or 84 of FIG. 1, and the second set of windings which connect to terminals C 218 and D 220 correspond to the other single coil, 84 or 82 of FIG. 1.

Figure 4B:
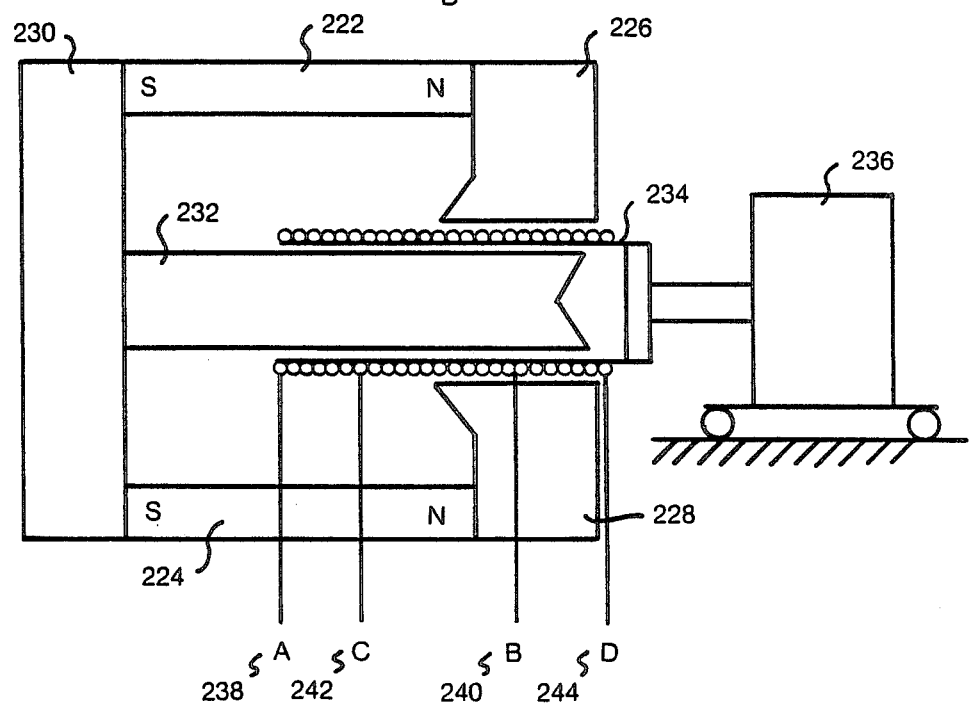

While the foregoing has broadly described the particular type of motor used in the preferred embodiment, it is to be understood that the teachings of the present invention may likewise be applied to other types of commutated motors, including a linear voice coil motor. FIG. 4B broadly illustrates a commutated linear voice coil motor which could be used in accordance with the teachings of the present invention. Referring to FIG. 4B, two magnets 222 and 224 are positioned adjacent to pole pieces 226 and 228, respectively. In this regard, like poles are positioned against the respective pole pieces, i.e., a north pole of magnet 222 is positioned adjacent to pole piece 226, and a north pole of magnet 224 is positioned adjacent to pole piece 228. The opposite poles of magnets 222 and 224 are each positioned adjacent to a common member 230, which further has placed adjacent to it a member 232. The members 226, 228, 230 and 232 operate to complete the respective magnetic circuits for magnets 222 and 224: the magnetic circuit associated with magnet 222 being comprised of members 226, 232 and 230, and in a similar manner, the magnetic circuit associated with magnet 224 being comprised of members 228, 232 and 230. A further member 234 having windings therearound is arranged for motion over member 232 under the influence of the magnetic fields produced by magnets 222 and 224 and a current flowing in the windings associated therewith, in a manner well known to those skilled in the art. Member 234 is further coupled to a payload 236. In accordance with the teachings of the present invention, multiple windings may be placed around member 234. In particular, a first winding terminating at points A 238 and B 240, is positioned at a selected position along the length of member 234; e.g., adjacent to one end of member 234 and extending approximately ¾ of the length thereof. A second winding terminating at points C 242 and D 244 is positioned at a selected position along the length of member 234; e.g., adjacent to the opposite end of member 234, and extending approximately ¾ of the length thereof. In a similar manner as previously discussed with respect to the motor of FIG. 4A, the windings associated with member 234 may likewise be commutated in accordance with the teachings of the present invention. Consequently, the teachings of the present invention may be applied by one of ordinary skill in the art to a broad range of commutated motors, and are not to be considered as limited to the particular type of motor described with respect to the preferred embodiment herein.

The characteristics of the two pole, two phase torquer motor used in the preferred embodiment previously discussed are those of a four step per revolution stepper motor, as will be understood by those skilled in the art. When a single phase alone of the two phase winding of the motor is excited with a fixed level of current, motor torque is developed, which tends to cause rotation of the rotor toward a magnetic null or zero torque position. Reversal of the polarity in the winding will cause the motor to seek a magnetic null 180 degrees away from the first null. Excitation of the second winding alone will similarly cause two magnetic nulls to be found, again at 180 degrees from each other, and mutually 90 degrees away from the magnetic nulls defined by the first winding of the motor. It is thus seen that the two windings define four magnetic null positions for the motor.

With a single winding excited with a fixed level of current, the motor will exhibit approximately a constant torque tending to rotate the rotor toward the magnetic null. This constant torque will be exhibited over a significant percentage of the 180 degrees between the null and the anti-null position.

Since the two pole two phase motor, having four magnetic null positions, acts as a four step per revolution stepper motor, the motor can be caused to rotate in 90 degree steps in a known direction by alternatively exciting each of the two windings with successively opposite polarities of current. As each winding is excited with a fixed level of current and polarity, the motor will seek to one of its four magnetic positions. Excitation of the other winding will then cause the motor to perform another 90 degree step in a known direction. Progressive sequential excitation of the two phases and polarities will thus cause the motor to move in 90 degree steps in a known direction, independent of the initial position of the motor.

Broadly stated, the apparatus of FIG. 1 operates to position transducer 120 to a selected position on disk 122 in the following manner. Referring once again to FIG. 1, the apparatus first performs a calibration sequence to determine current values of parameters associated with the system. In particular, the commutation points for Motor 80 are determined, the maximum and minimum values for both periodic signals produced by Encoder 140 are determined, the offset currents associated with the operation of the combinations of Digital-to-Analog Converter 40 and Motor Drive Amplifier 60, and Digital-to-Analog Converter 52 and Motor Drive Amplifier 70 are determined, and the location of a selected track on the surface of disk 122 is determined.

Initially, Motor 80, Encoder 140 and Transducer apparatus 120 are in an unknown position. It is therefore necessary to cause the motor to move to a known position from which successive programmed motions may be initiated. Mechanical stops placed at both the outer and inner periphery of Disk 122 operate to limit motion of Transducer assembly 120 to selected positions at the outer and inner periphery of Disk 122. Motor 80, under control of Microprocessor 10, operates through successive excitation of windings 82 and 84 of Motor 80 through the associated Motor Drive Amplifiers 60 and 70, and Digital-to-Analog Converters 40 and 50 to position Transducer assembly 120 against the outer mechanical stop. However, because of the possibility that the unknown initial position of Motor 80 may in fact already be against the inner or outer stop, it is necessary to confirm first that motion has in fact been initiated, and subsequently, that motion has ceased to occur when the motor contacts the outer stop. This is accomplished by Microprocessor 10 monitoring the outputs 142 and 144 of Encoder 140 through Analog Multiplexer 90 and Analog-to-Digital Converter 110 on terminal 22 of Microprocessor 10.

After Transducer assembly 120 has been positioned against the outer mechanical stop as above described through the observation of the signals from Encoder 140, Motor 80 will be in a known rotational position. From this known rotational position, programmed sequences of motion can be initiated to achieve desired new positions of Motor 80, Encoder 140 and Transducer 120, as more fully described hereinafter.

Calibration data on the output signals from terminals 142 and 144 of Encoder 140 is next determined. By successive excitation of the two phases of Motor 80 in a stepping mode, Transducer apparatus 120 is caused to move from the known position at the outer mechanical stop to the inner mechanical stop. While this motion is occurring, Microprocessor 10, operating through Analog Multiplexer 90 and Analog-to-Digital Converter 110 samples the outputs from terminals 142 and 144 of Encoder 140, and records the minimum and maximum values thereof. In the preferred embodiment, continuous motion of Transducer apparatus 120 across Disk 122 will produce a sine signal on terminal 142 and a cosine signal on terminal 144 of Encoder 140. The stored maximum and minimum digital words consequently represent the maximum and minimum values of the corresponding sine and cosine signal outputs from Encoder 140. The difference between the maximum and minumum values for both the sine and cosine signals respectively, define peak-to-peak output values from Encoder 140 for the two respective signals, i.e. sine and cosine, from terminals 142 and 144, and therefore a scale factor which allows Microprocessor 10 to determine an exact angular position of Encoder 140 at any future time.

An average value for each of the sine and cosine signals, obtained by adding the respective maximum and minimum digital words for each of the sine and cosine signals, and dividing by two in Microprocessor 10, defines a mid-point on each of the sine and cosine signals, which is a zero cross-over point for the two respective signals. Each zero cross over point of the sine signal defines a nominal location of a center of a magnetic track on Disk 122.

Subsequent to completing the encoder calibration procedure as above described, Motor 80 is caused to return Transducing apparatus 120 again to the outer mechanical stop, in the same manner as above described. Thereafter zero offset errors associated with the operation of Digital-to-Analog Converters 40 and 50 and Motor Drive Amplifiers 60 and 70 are determined. In particular, the exact digital word required to be coupled to each of Digital-to-Analog Converters 40 and 50 to achieve zero current out of the associated Motor Drive Amplifier is determined. The foregoing is accomplished by sequentially exciting each of windings 82 and 84 of Motor 80 to effect the positioning of Transducer assembly 120 in the approximate center of the area on Disk 122 wherein data is stored. One of the windings of Motor 80 is then energized and Motor 80 is allowed to seek the associated magnetic null. The opposite winding is then energized and a position servo loop described in more detail hereinafter with respect to the Detent Mode of operation, is operated to cause Transducer assembly 120 to seek one of the zero crossing positions of the sine wave signal from terminal 142 of Encoder 140. The position thus established is exactly on the nominal center of one of the tracks on Disk 122, and stable position control is established. With the motor encoder and transducer at controlled rest, there can be no torque developed by Motor 80, and therefore no current in windings 82 or 84. With this zero current condition established, the digital word at the input of Digital-to-Analog Converter 40 or 50 which produces this zero current condition is noted and stored by Microprocessor 10. The difference between this word and the nominal zero current command word are determined and stored.

During the determination of this offset correction word at the input of the respective digital-to-analog converters, Microprocessor 10 causes Transducer assembly 120 to "dither" slightly about its nominal rest position in order to minimize the effects of friction which might otherwise distort the measurement of this offset word. In the preferred embodiment a total of 400 readings of the input words to the digital-to-analog converters are taken and averaged by Microprocessor 10 to determine an average offset value.

After the offset compensation value for one digital-to-analog converter has been determined, as above described, that same winding is then fully energized, causing Motor 80 and Transducer apparatus 120 to position to the magnetic null position defined by that winding. The other winding is then energized in the position control loop as above described above, and the offset digital word required for the digital-to-analog converter controlling the second winding is similarly determined.

In order to maintain constant torque as a function of current from Motor 80, it is necessary to switch, or commutate, between the two windings 82 and 84 at a position approximately halfway between the magnetic nulls defined by the two windings, or at 45 degrees between the four magnetic nulls. The purpose of the commutation determination procedure is to identify the location of the four magnetic nulls, angularly, as measured by Encoder 140. With these measurements, the optimum commutation point for Motor 80 is then defined as being half way between the measured magnetic null angular positions.

A counter, hereinafter referred to as a Commutation Counter, is employed in Microprocessor 10 in the commutation process. The Commutation Counter increments or decrements responsive to each crossing of a track by Transducer assembly 120; the Commutation Counter increments on each zero crossing of the sine signal resulting from motion of Transducer apparatus 120 in a first direction of motion with respect to Disk 122, and decrements responsive to each crossing of a track by Transducer assembly 120 in the opposite direction of motion. In response to motion of Transducing apparatus 120 in the first direction, the Commutation Counter is arranged to count up to a preselected maximum value, and thereafter to reset to zero, and repeat the counting process once again. In response to motion of Transducing apparatus 120 in the opposite direction, the Commutation Counter is arranged to count down to zero, and thereafter reset to the preselected maximum value, and again continue the decrementing process. Commutation of the windings of Motor 80 occur each time the count in the Commutation Counter changes from the maximum value to zero, or from zero to the maximum value.

After completion of the determination of the offset values of the digital-to-analog converters and the associated motor drive amplifiers as above discussed, Motor 80 is again energized in a stepper mode, and caused once again to go to the outer mechanical stop. After Motor 80 has come to rest against the outer mechanical stop, Motor 80 is caused to step inward in a location toward the center of the area on which data is to be stored on Disk 122. One of the two windings 82 or 84 of Motor 80 is then energized and Motor 80 is allowed to rotate to the corresponding magnetic null position. As has been described above, this magnetic null position is approximately half way between the optimum commutation points between the two windings. With Motor 80 in this magnetic null position, a commutation counter in Microprocessor 10 is set to a value equal to one-half of the previous discussed preselected maximum value. In the preferred embodiment, the preselected maximum value is 300, hence the Commutation Counter is set to a value of 150. The Commutation Counter is arranged that it will overflow at a count of 300, resetting to 0, and underflow at a count of 0, resetting to 300. The input to this Commutation Counter is derived from the zero crossing signals obtained by the sine output of Encoder 140. The counter continually counts track crossings and causes commutation between the two windings to occur whenever either an underflow or overflow occurs in the Commutation Counter.

The final task to be performed in the calibration mode is to position Transducer apparatus 120 exactly over track number 0, i.e., the first track used for the storage of data. In this regard it will be understood that in the preferred embodiment, track 0 corresponds to the first track on which data information will be stored. However, in the preferred embodiment there are further tracks positioned between track 0 and the outer mechanical stop which are not used to for the storage of data information, and will be referred hereinafter as tracks having negative track numbers, e.g., tracks −1, −2, etc. with track −1 being adjacent to track 0. As noted above, at the completion of the initialization of the Commutation Counter, Transducer assembly 120 is positioned over the area on Disk 122 used for the storage of data information. Prior to the initiation of the commutation calibration routine, a counter in Microprocessor 10 has been reset to 0 with Motor 80 positioned against the outer mechanical stop. This counter will be hereinafter referred to as the Track Crossing Counter. As Transducer assembly 120 is moved inward, Track Crossing Counter is incremented as each track crossing is indicated by the output of the sine signal from terminal 142 of Encoder 140. When the Commutation Counter initialization is complete, the Track Crossing Counter contains a number which is equal to the total number of tracks crossed from the outer mechanical stop to the current location of Transducer assembly 120.

During the manufacturing process, servo burst information previously described with respect to FIG. 3 (servo bursts 202 and 204) was permanently prerecorded on every track of Disk 122, with the exception of the tracks having a negative track number. Thus all tracks beginning with track zero and inward toward the center of Disk 122 have prerecorded both servo bursts 202 and 204 (FIG. 3). All tracks having a negative track number, however, have prerecorded only one of the two servo burst, e.g., servo burst 202.

Microprocessor 10 issues a command to a position control servo loop, more fully described hereinafter, which causes Motor 80 to position Transducer assembly 120 over a selected track having a negative number inward from the outer mechanical stop. As this track will contain only one of the servo bursts, examination of servo burst signals therefrom by Microprocessor 10 through Preamplifier 131, Gated Integrator 130, Analog Multiplexer 90 and Analog-to-Digital Converter 110 (FIG. 1) will indicate the absence of one of the servo bursts, i.e., there will be a large difference between the amplitudes determined for each of the servo bursts. When this large difference is found, indicating the lack of both servo bursts, Microprocessor 10 issues a command to the servo loop which causes Transducer assembly 120 to be moved inward by one track. The servo burst comparison is again made, and if a large difference is again found, another inward step is initiated. This process continues until Microprocessor 10 finds the first track on which both servo bursts exist. This is the desired track 0. When track 0 has been identified, the value in the Track Crossing Counter is noted and stored by Microprocessor 10. At all later times, the track number can then be determined by subtracting this prerecorded value from the value in the Track Cross Counter.

If, by reason of some malfunction or other difficulty, Microprocessor 10 does not find a missing servo burst, the process is repeated a selected number of times. If Microprocessor 10 still does not find a missing servo burst, the entire calibration process is aborted, and an operator notified by a signal from terminal 28 of Microprocessor 10.

Microprocessor 10 makes use of three counters in the positioning of Transducer apparatus 120 to a desired location on Disk 122: a Track Crossing Counter, a Commutation Counter and a Tracks To Go Counter.

The Track Crossing Counter has been previously discussed with regard to the calibration operations, and is a counter which increments and decrements based on zero crossings of the sine signal from terminal 142 of Encoder 140 (FIG. 1). Every zero crossing of the sine signal from terminal 142 defines an approximate track center location. Track Crossing Counter maintains a continuous record of the location of Transducer apparatus 120 relative to the tracks of Disk 122 by incrementing and decrementing as the tracks are crossed in the calibration mode. The determination to increment or decrement is made based on the direction of motion as the zero crossings of the sine signal occur.

The Tracks To Go Counter is a counter which maintains a record of how far away Transducing assembly 120 is from a desired track. External Commands coupled to terminal 28 of Microprocessor 10 (FIG. 1) cause the Tracks To Go Counter to increment, and track crossings determined from zero crossings of the sine signal from terminal 142 of Encoder 140 are used to decrement the Tracks To Go Counter.

In the calibration procedure previously described, the Tracks Crossing Counter alone is used to maintain a continuous record of the location of Transducer apparatus 120. However, in the various seek modes to be more fully discussed hereinafter, both the Track Crossing Counter and the Tracks To Go Counter are employed. At the start of a seek operation, i.e., moving Transducing apparatus 120 from a current position to a desired position, the Track Crossing Counter is updated to the number of the destination track, while the To Go Counter maintains the actual position relative to the destination, being updated by track crossing signals, i.e., zero crossings of the sine signal from terminal 142 of Encoder 140.

The Commutation Counter is used to determine when to commutate the windings 82 and 84 associated with Motor 80, through the associated Digital-To-Analog Converters 40 and 50, and Motor Drive Amplifiers 60 and 70. The Commutation Counter increments and decrements in the same manner as the Tracks To Go Counter. The Commutation Counter, however, is preset during the calibration process and overflows or underflows at a preselected values, with commutation occurring with each over or underflow. Thus, the Commutation Counter continually maintains a record of which of the windings of Motor is desired to be energized.

A control servo loop consists of Microprocessor 10, Digital-to-Analog Converters 40 and 50, Motor Drive Amplifiers 60 and 70, the windings 82 and 84 of Motor 80, Encoder 140 and Transducing apparatus 120. The output of Encoder 140 provides the feedback signal through Analog Multiplexer 90 and Analog-to-Digital Converter 110. As has been previously discussed, the two output signals from terminals 142 and 144 of Encoder 140 provide continuous instantaneous position information of Transducer apparatus 120. The velocity with which Transducer assembly 120 is moving relative to the Disk 122 is determined by measuring the time between successive measurements of displacement signals from Encoder 140. Microprocessor 10 further implements a digital integrator, whose input is a calculated position error signal derived from the output of Encoder 140, as more fully discussed hereinafter with respect to the Detent mode of operation.

It will be understood by those skilled in the art that Microprocessor 10 operates as a multiplexed data processor wherein all necessary computations for the control of the disk drive are performed with and through Microprocessor 10, according to a permanently recorded control program and associated information tables, as more fully discussed hereinafter. As it is inherent in the operation of Microprocessor 10 that only one calculation may be performed at any single time, control calculations are accomplished by sequentially performing the many calculations required for the complete control process. The speed at which Microprocessor 10 is capable of performing the required calculations is sufficiently high that Microprocessor 10 is able to perform all of the necessary calculations required with respect to the control process by multiplexing, i.e., by successively performing the various calculations in sequence.

As previously discussed, four control modes are employed according to the present invention in the positioning of Transducer apparatus 120 from a current position to a desired position: a High Speed Mode, a Medium Speed Mode, a transition Mode and a Detent Mode. As the calculations required in each of the four control modes are different, the the time required for each also differ. Consequently, the manner in which each of the control modes operates are based upon the required calculations times, as will be more fully discussed hereinafter.

The four modes of operation provide for the orderly positioning of Transducing apparatus 120 from a current position to a desired position. Consequently, each of the four modes have unique operational characteristics selected to accomplish the desired positioning task.

Broadly stated, the High Speed Mode of operation relates to the management of the positioning of Transducing apparatus 120 when it is moving at a velocity greater than a preselected velocity. In the preferred embodiment, the first preselected distance is 108 tracks, and the preselected velocity is 6.7 inches per second. In the High Speed Mode of operation, if the distance from the desired destination is greater than the first preselected distance, the High Speed Mode of operation requires Transducing apparatus 120 to move toward the desired position at a preselected maximum velocity which, in the preferred embodiment is 10 inches per second. If the distance is less than the first preselected distance, the High Speed Mode of operation requires Transducing apparatus 120 to move toward the desired position at a velocity which is determined according to the distance remaining to travel. This distance-velocity relationship is according to the well known fractional power relationship, the precise fractional power being empirically determined from the mechanical and electrical characteristics of a particular design, as is well known to one of ordinary skill in the art. In the High Speed Mode of operation, position of Transducing apparatus 120 is monitored with respect to every other track crossing on Disk 122, i.e., with respect to every other zero crossing of the sine signal.

Broadly stated, the Medium Speed Mode of operation relates to the management of the positioning of Transducing apparatus 120 when it is less than the first preselected distance from the desired destination (108 tracks in the preferred embodiment), but greater than a second preselected distance (3 tracks in the preferred embodiment), and when the velocity of Transducing apparatus is less than the preselected velocity (6.7 inches per second in the preferred embodiment). In the Medium Speed Mode of operation, the desired velocity of Transducing apparatus 120 is again determined by the remaining distance from the desired position from a distance-velocity table as previously discussed with respect to the High Speed Mode of operation. However, in the Medium Speed Mode of operation, position of Transducing apparatus 120 is monitored with respect to every track crossing on Disk 122, i.e., with respect to every zero crossing of the sine signal.

Broadly stated, the Transition Mode of operation relates to the management of the positioning of Transducing apparatus 120 when it is less than the second preselected distance (3 tracks in the preferred embodiment), but greater than a third preselected distance (192 microinches in the preferred embodiment). In the Transition Mode of operation, the desired velocity of Transducing apparatus 120 is again determined by the remaining distance from the desired position from a distance-velocity table as previously discussed with respect to the High and Medium Speed Modes of operation. However, in the Transition Mode of operation, position information from Encoder 140 is more frequently monitored than was the case with the High and Medium Speed mode. In addition, both the sine and cosine signal from Encoder 140 are monitored. Monitoring of both the sine and cosine signals is necessary as both signals have non-linear regions therein, e.g, each signal is approximately linear within 45 degrees of each zero crossing, and becomes increasingly non-linear thereafter. Consequently, when one signal is in the non-linear region, position determination is accomplished by monitoring the alternate signal from Encoder 140, in a manner well known to those skilled in the art. As position information is known to a higher degree than was the case in the High and Medium Speed Modes, the velocity table used in the Transition Mode correspondingly provides desired velocity information in accordance with the higher degree of position accuracy.

Broadly stated, the Detent Mode of operation relates to the final positioning of Transducing apparatus 120 when Transducing apparatus 120 is less than the third preselected distance from the desired position (192 microinches in the preferred embodiment). The Detent Mode is a position control servo loop using a Position Integral Differentiation technique, well known to those skilled in the art, as more fully discussed in *Control and Dynamic Systems* by Takahasi, Rabins and Asulander, published by Addisson Wesley, November 1972, which is hereby incorporated by reference. As was the case with the Transition Mode, position information is again determined by the monitoring of both the sine and cosine signals from Encoder 140.

In accordance with the present invention, in the High Speed and Medium Speed Modes of operation, high resolution of the instantaneous position of Transducing apparatus 120 with respect to Disk 122 is not maintained. Rather, position information of Transducer apparatus 120 is only maintained with respect to the number of tracks which have been crossed, by updating Commutation Counter and Tracks To Go Counter in response to detected zero crossings of the sine signal from terminal 142 of Encoder 140. Velocity information of Transducer apparatus 120 is thereafter determined by measuring the time which elapse between successive track crossings.

In the preferred embodiment, external commands calling for a move to a desired new track are received on terminal 28 of Microprocessor 10, and consist of a first signal indicating the desired direction of motion, and a second signal comprising a series of pulses, the number of which indicating the number of tracks Transducing apparatus 120 is to be moved, in accordance with the Seagate ST506/ST412 Interface Standard. The number of pulses received are accumulated in the Tracks To Go Counter within Microprocessor 10.

Figure 5A:
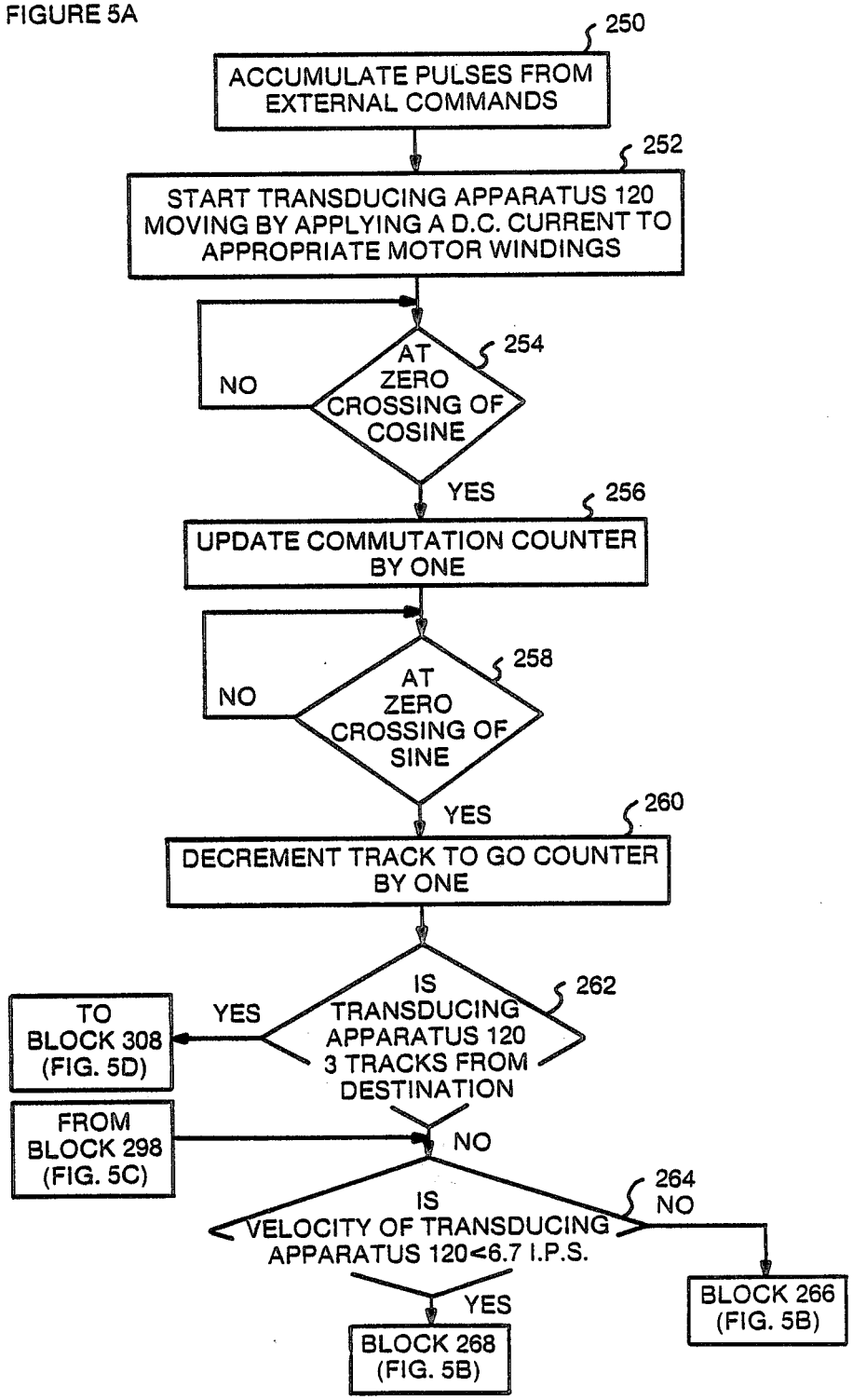

When the contents of Tracks To Go Counter is not zero, a seek routine is initiated. FIGS. 5A–5E illustrate of the seek routine. Referring now to FIG. 5A, pulses indicating a desired amount of motion, as previously discussed, received on terminal 28 of Microprocessor 10 are first accumulated, as indicated in block 250. Motion is initiated whenever this count is not zero. The first step is to apply an acceleration current through Digital-to-Analog Converter 40 or 50 (FIG. 1), and the corresponding Motor Drive Amplifier 60 or 70 to motor windings 82 or 84, as indicated in block 252. The value of current which is supplied is determined based upon whether the destination track is greater than a preselected number of tracks away. In the preferred embodiment, the preselected number of tracks was 50. Consequently, a first maximum amount of current is supplied to a selected motor winding 82 or 84 if the number of selected tracks is greater than 50 tracks away, and a second maximum amount of current if the number of selected tracks is less than 50 but more than 3 tracks away. The maximum amount of current in each of the two cases is empirically determined from mechanical and electrical performance considerations unique to a particular design. As motion begins, the output of the cosine signal on terminal 144 of Encoder 140 is monitored in block 254 through Analog Multiplexer 90 and Analog-to-Digital Converter 110 until a zero crossing of the cosine signal is detected, as indicated by a change in polarity of the cosine signal. This confirms that motion has in fact begun. The zero crossing of the cosine signal is also used to update the Commutation Counter by one in block 256. Thereafter, Microprocessor 10 switches Analog Multiplexer 90 to monitor the sine signal from terminal 142 of Encoder 140, and in a similar manner determines the zero crossing of the sine signal in block 258, thereafter decrementing the Tracks To Go Counter by one in block 260. Microprocessor 10 thereafter in block 262 makes a comparison of the count in the Tracks To Go Counter with a second preselected distance. If the count is less than the preselected number of tracks, the Transition Mode of operation is thereafter entered, as will be more fully discussed hereinafter with respect to FIG. 5D. However, if the count is not less than the preselected number of tracks, the operational mode will remain in the High Speed or Medium Speed mode, as more fully discussed hereinafter. In the preferred embodiment, the preselected number of tracks is three.

Microprocessor 10 next determines in block 264 if the velocity of Transducing apparatus 120 is above a preselected velocity. If the velocity is above the preselected velocity, the High Speed Mode of operation is entered, and the operations indicated generally by block 266 (FIG. 5B) will next be performed, as more fully discussed hereinafter. If the velocity is less than the preselected velocity, the Medium Speed Mode of operation is entered, and the operations indicated generally by block 268 will thereafter be performed, as more fully discussed hereinafter. In the preferred embodiment, the preselected velocity is 6.7 inches per second.

At this time, as motion has just be initiated, it is known that the velocity of Transducing apparatus 120 cannot be above the preselected velocity. Initial positioning operations are therefor performed in the Medium Speed Mode. Microprocessor 10 will consequently next enter the Medium Speed Mode of operation by performing the operation broadly indicated in block 268 of FIG. 5B. Referring now to FIG. 5B, Microprocessor 10 updates Commutation Counter by one in block 268, with the update being either an increment or decrement depending upon the direction of motion of Transducer apparatus 120. In the Medium Speed Mode, position information of Transducing apparatus 120 is determined with respect to each zero crossing of the sine signal from terminal 142 of Encoder 140. Consequently, blocks 270, 272 and 274 relate to the monitoring of each crossing of the sine signal. Microprocessor 10 next determines whether the zero crossing of the sine signal was a change from a positive to a negative value, or a change from a negative value to a positive value, and on that basis continues to monitor the output from terminal 142 of Encoder 140 as previously discussed until the reverse transition at the next zero crossing. In particular, in block 270 Microprocessor 10 determines if the last zero crossing of the sine signal was a transition from a negative value to a positive value, and if so, next performs the operations indicated generally by block 274; otherwise performs the operations indicated in block 272. In block 274 Microprocessor 10 waits for the next transition of the sine signal from a negative value to a positive value, and thereafter performs the operation indicated generally in block 276. In block 272, Microprocessor 10 waits for the next transition of the sine signal from a positive value to a negative value, and thereafter performs the operation indicated generally in block 276. In block 276, Microprocessor 10 determines the time between the prior sine signal zero crossing and the time at which the immediately preceeding sine signal zero crossing occurred. This time difference is a direct indication of the velocity at which Transducing apparatus 120 is moving. Thereafter Microprocessor 10 decrements the Tracks To Go Counter by one in block 278. Microprocessor 10 next checks the value of the Tracks To Go Counter in block 280 to determine if Transducing apparatus 120 is at the second preselected distance (3 tracks in the preferred embodiment) from the desired destination. If Transducing apparatus 120 is the selected number of tracks from the desired destination, the Transition Mode of operation is entered, as will be more fully discussed hereinafter; otherwise, Microprocessor 10 next checks the velocity of Transducing apparatus 120 in block 282. In block 282, Microprocessor 10 compares the determined velocity of Transducing apparatus 120 with the previously discussed preselected velocity (6.7 inches per second in the preferred embodiment) to determine if Transducing apparatus 120 is moving at a greater velocity. If Transducing apparatus is moving at a greater velocity, operation in the High Speed Mode will be indicated by the setting of a Mode 2 Flag in block 286; otherwise, the Mode 2 Flag will be cleared in block 284 indicating the Medium Speed Mode in block 284.

Figure 5C:
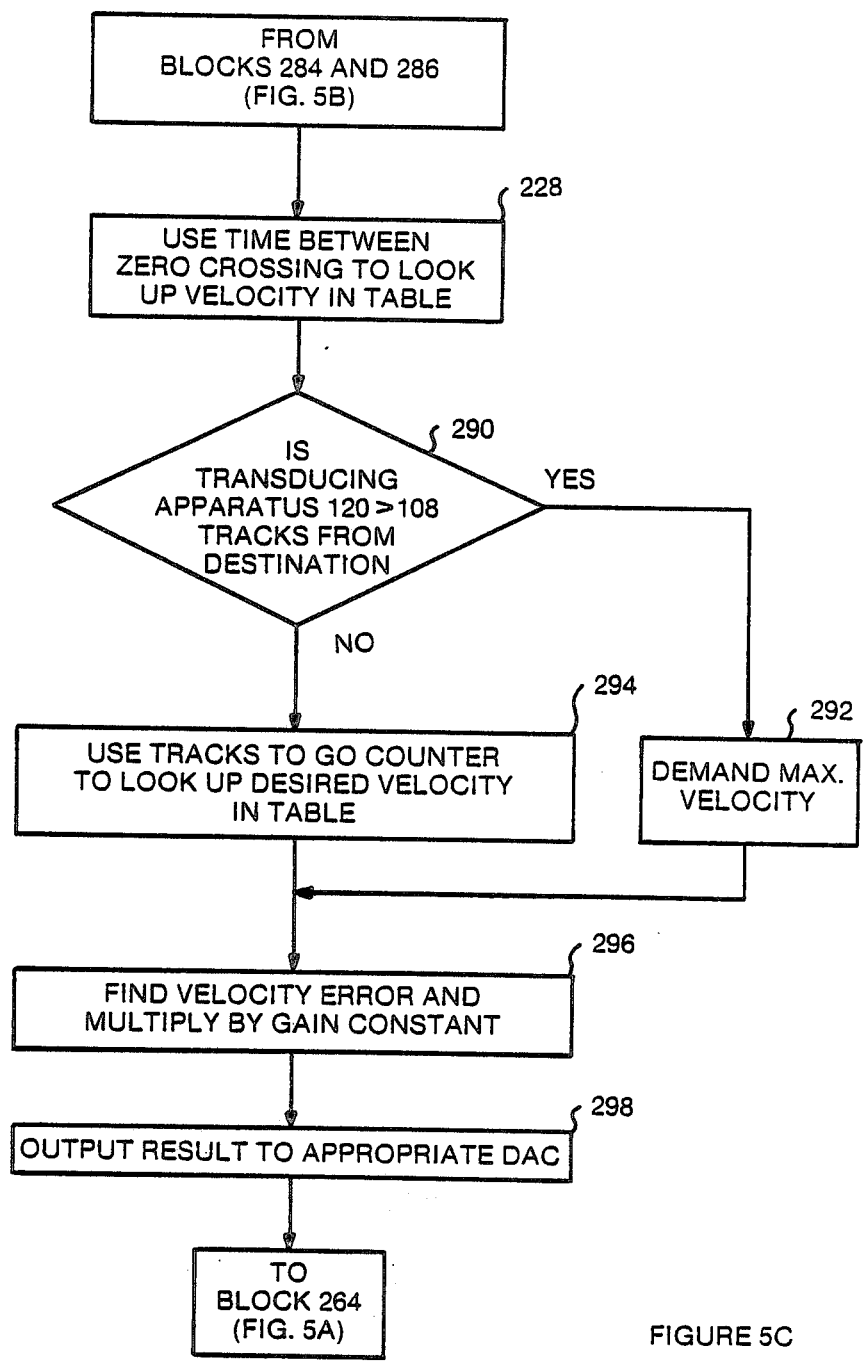

Referring now to FIG. 5C, Microprocessor 10 next in block 288 uses the foregoing determined measured time between zero crossings of the sine wave to access a first look up table from which a corresponding velocity of Transducing apparatus 120 may be determined. From the velocity so determined from the first look up table, Microprocessor 10 next determines in block 290 if Transducing apparatus 120 is greater than the first preselected distance (108 tracks in the preferred embodiment) from the desired location. If Transducing apparatus 120 is greater than the first preselected distance, a preselected maximum velocity (10 inches per second in the preferred embodiment) is desired for Transducing apparatus 120 in block 292; if Transducing apparatus 120 is less than or equal to the first preselected distance, Microprocessor 10 thereafter performs the operations indicated generally by block 294.

In block 294, Microprocessor 10 checks the current value in the Tracks To Go Counter to determine the remaining distance to the desired destination track. The remaining distance is thereafter used with a second look up table to determine a corresponding desired velocity for Transducing apparatus 120 based upon the remaining distance. In this regard, the values in the second look up table follow the well known fractional power law for desired velocities of motion based upon remaining distance as previously discussed. Microprocessor 10 thereafter in block 296 determines the difference between the velocity previously determined in block 276 with the desired velocity determined from the second look up table in block 294 to determine a velocity error and thereafter multiplied by a gain constant. The velocity of Transducing apparatus 120 is thereafter adjusted in block 298 in accordance with the determined velocity error by a signal applied to the appropriate motor winding 82 or 84 through the associated Digital-to-Analog Converter 40 or 50 and the corresponding Motor Drive Amplifier 60 and 70.

Referring now to FIG. 5A, Microprocessor 10 next returns to block 264, and again determines if the velocity of Transducing apparatus 120 is greater than the preselected velocity (6.7 inches per second in the preferred embodiment). If the velocity is greater than the preselected velocity, operation in the High Speed mode is indicated.

In the High Speed Mode, the total computations to be done require more time for Microprocessor 10 to perform than is available between successive zero crossings of the sine wave. The control loop is therefore changed to measure every second zero crossing of the sine signal. Each such transition indicates that two tracks have been traversed since the last update of the several system counters. Therfore, in the High Speed Mode, the first step is to update the Commutation Counter by two tracks, which Microprocessor 10 performs in block 266 (FIG. 5B), and thereafter determines in block 300 if the last zero crossing of the sine signal was a transition from a negative value to a positive value, hereinafter referred to as a positive transition, or a transition from a positive value to a negative value, hereinafter referred to as a negative transition. If the previous transition was not a positive transition, Microprocessor 10 next in block 302 monitors the sine signal from terminal 142 of Encoder 140 and waits for a negative transition to occur, thereafter performing the operations indicated generally by block 304. If the previous transition was a positive transition, Microprocessor 10 waits for the next positive transition to occur in block 306. Microprocessor 10 determines the time at which the transition occurs in block 304, and determines therefrom the time from the preceeding transition. The value so determined is thereafter divided by two in block 304. Microprocessor 10 thereafter in block 306 decrements the Tracks To Go Counter by two, and thereafter performs the operations previously discussed with respect to block 280.

The maximum velocity in the High Speed Mode continues until the Tracks To Go Counter indicates that Transducer apparatus 120 is less than the preselected number of tracks from the desired destination (108 tracks in the preferred embodiment). When this occurs, the look up table provides the previously described reduced velocity, and subsequent velocity values progressively decrease as the Tracks To Go Counter decreases below the preselected number of tracks.

As the foregoing operation continues to control the velocity of Transducing apparatus 120, the Commutation Counter continues to determine which of the two coils of Motor 80 is the appropriate coil to be energized at any given time, and perform the necessary commutations as previously discussed.

The foregoing operation results in the velocity of Transducing apparatus 120 decreasing in a predetermined manner. When the measured velocity drops below the preselected velocity (6.7 inches per second in the preferred embodiment), the Mode 2 Flag is cleared in block 284, and the Medium Speed Mode of operation is entered.

The Medium Speed Mode continues to reduce the velocity of Transducing apparatus 120 until Microprocessor 10 determines that Transducing apparatus 120 is within 3 tracks from the desired destination, at which time the Transition Mode is entered.

When the Transition Mode is entered, the velocity of Transducing apparatus 120 has dropped to such a value that a measurement of velocity based on the time between zero crossings would not provide sufficient resolution to properly control Trasducing apparatus 120 in a desired manner. In this mode therefore, Microprocessor 10 begins to read both the sine and cosine signals of Encoder 140, i.e., the signals present on terminals 142 and 144 of Encoder 140, to read not only zero crossings, but instantaneous values. The instantaneous values of the sine and cosine provide continuous relative position information.

In the Transition Mode, Microprocessor 10 determines velocity of Transducing apparatus 120 on a regular basis by measuring the displacement difference at regular intervals. In the preferred embodiment, the time interval at which displacement is measured is 135 microseconds. The velocity so determined is utilized in the same manner as previously described in the High Speed and Medium Speed mode of operation, and compared with the desired velocity determined from the second look up table, in order to determine the velocity error, and thus control Motor 80 to achieve the desired velocity.

Microprocessor 10 determines the present distance from the desired destination using the Tracks To Go Counter and position information from the sine and cosine signals from Encoder 140. The position error thus derived is used in a third look up table to determine the desired velocity which is thereafter used to control excitation of Motor 80.

Figure 5D:
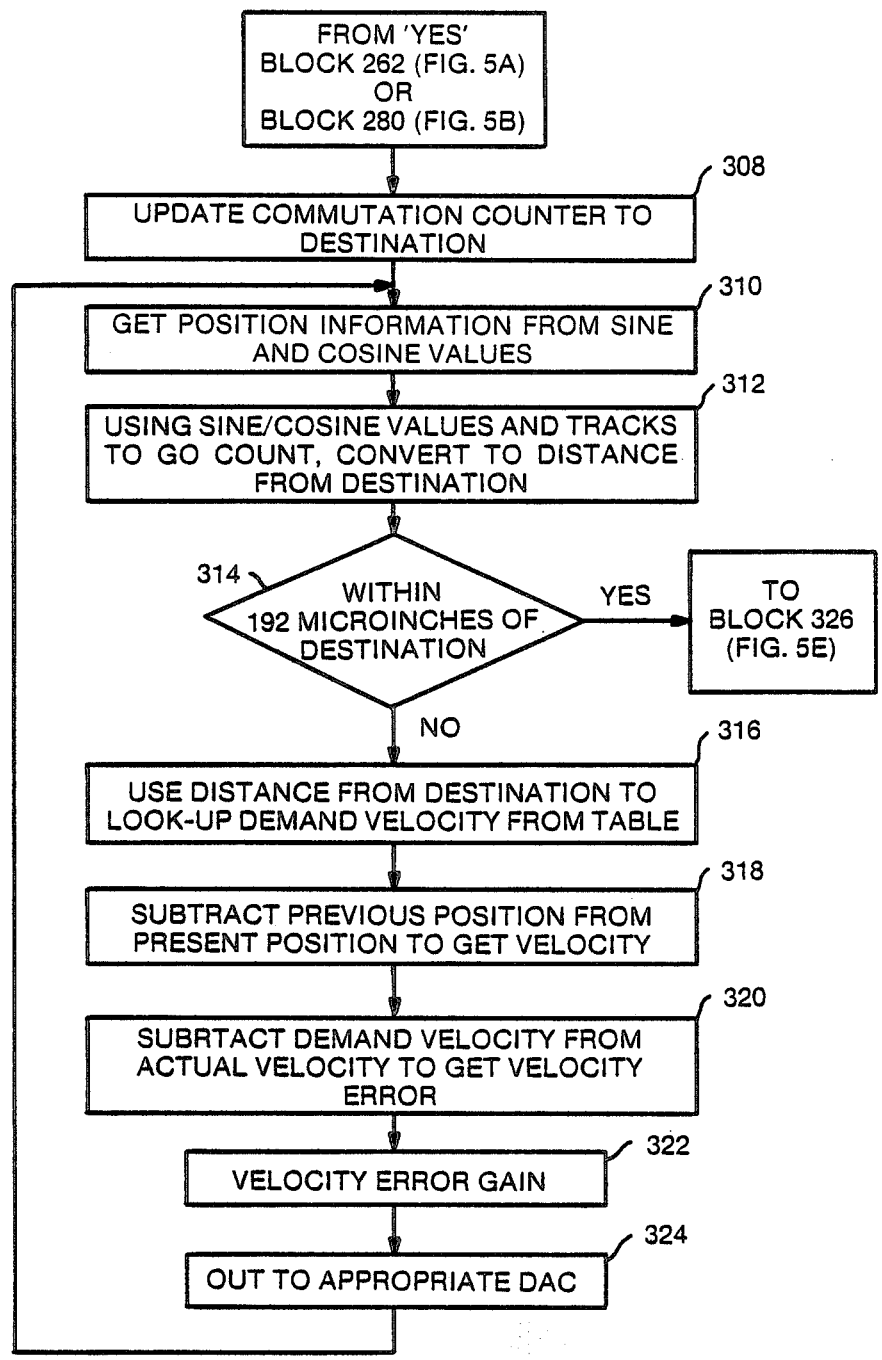

The sequence of steps associated with the Transition Mode begins with a positive determination in either block 262 (FIG. 5A) or block 280 (FIG. 5B), and are indicated in FIG. 5D. Referring now to FIG. 5D, Microprocessor 10 in block 308 up-dates the Commutation Counter by the number of tracks to go to the destination tracks (1 to 3 in the preferred embodiment). This is performed to ensure that if the Commutation Counter happens to be close to performing a commutation (within 3 tracks in the preferred embodiment), the commutation will be forced to take place at this time, rather at a later point. If the commutation were allowed to take place at a later point, undesirable transients could be introduced into the positioning of Transducing apparatus 120.

Microprocessor 10 next in block 310 gets current position information of Transducer apparatus 120 from the sine and cosine signals from Encoder 140. In block 312, Microprocessor 10 next determines the distance Transducer apparatus 120 is from the desired destination using the sine and cosine values and the information in Tracks To Go Counter. In block 314, Microprocessor next determines if the distance to go is less than the third preselected distance (192 microinches in the preferred embodiment). If the distance is less than the third preselected distance, the Detent Mode of operation is entered at block 326 in FIG. 5E, otherwise block 316 is next performed. In block 316, Microprocessor 10 determines the desired velocity for Transducing apparatus 120 from the previously discussed look up table, and in block 318 determines the current velocity of Transducing apparatus 120. In block 320 Microprocessor 10 next determines the difference between the desired velocity and the measured velocity of Transducing apparatus 120, and in block 322 adjusts the value so obtained by a velocity gain error. The velocity gain error is a constant which is empirically determined by parameters associated with a particular design. In block 324, Microprocessor 10 outputs the value so determined to the appropriate digital-to-analog converter to drive the motor winding. Thereafter, Microprocessor 10 next repeats the foregoing described procedure starting with the operations previously discussed with respect to block 310.

When the position error decreases to a value less than a preselected distance, the Detent Mode of operation is entered, i.e., with a positive determination in block 314 (FIG. 5D). In the preferred embodiment, the preselected distance is 192 microinches.

In the Detent Mode of operation, velocity is determined in a similar manner as in the Transition Mode, except that instead of making a comparison every 135 microseconds, the comparison of position is made every 70 microseconds. Position error is determined in the same way as in the Transition Mode previously discussed, but requires reference only to the signal being derived from the sine signal of Encoder 140. This is possible due to the fact that as Transducing apparatus 120 is within 192 microinches of a zero crossing, corresponding position information for the sine signal is on the linear portion thereof, i.e., close to a sine signal zero crossing. Consequently, position information can therefore be determined exclusively from this signal. Microprocessor 10 must, however, determine whether the desired track center location is defined by the positive going or negative going slope of the sine signal, which is done by reference to the Track Crossing Counter. In the Detent Mode, control of position is accomplished by employing the Position Integral Differentiation approach, as previously referenced. Using the Position Integral Differentiation approach, a sum is determined of velocity error, position error and the integral of the position signal. Velocity and position error have been previously described. The position integral is developed by Microprocessor 10 by adding the position error determined to a register which builds up the integral of the position error by successive additions of the position error. The previously described servo burst correction offset is further added to the position signal derived from the sine signal from Encoder 140, as discussed hereinafter.

Figure 5E:
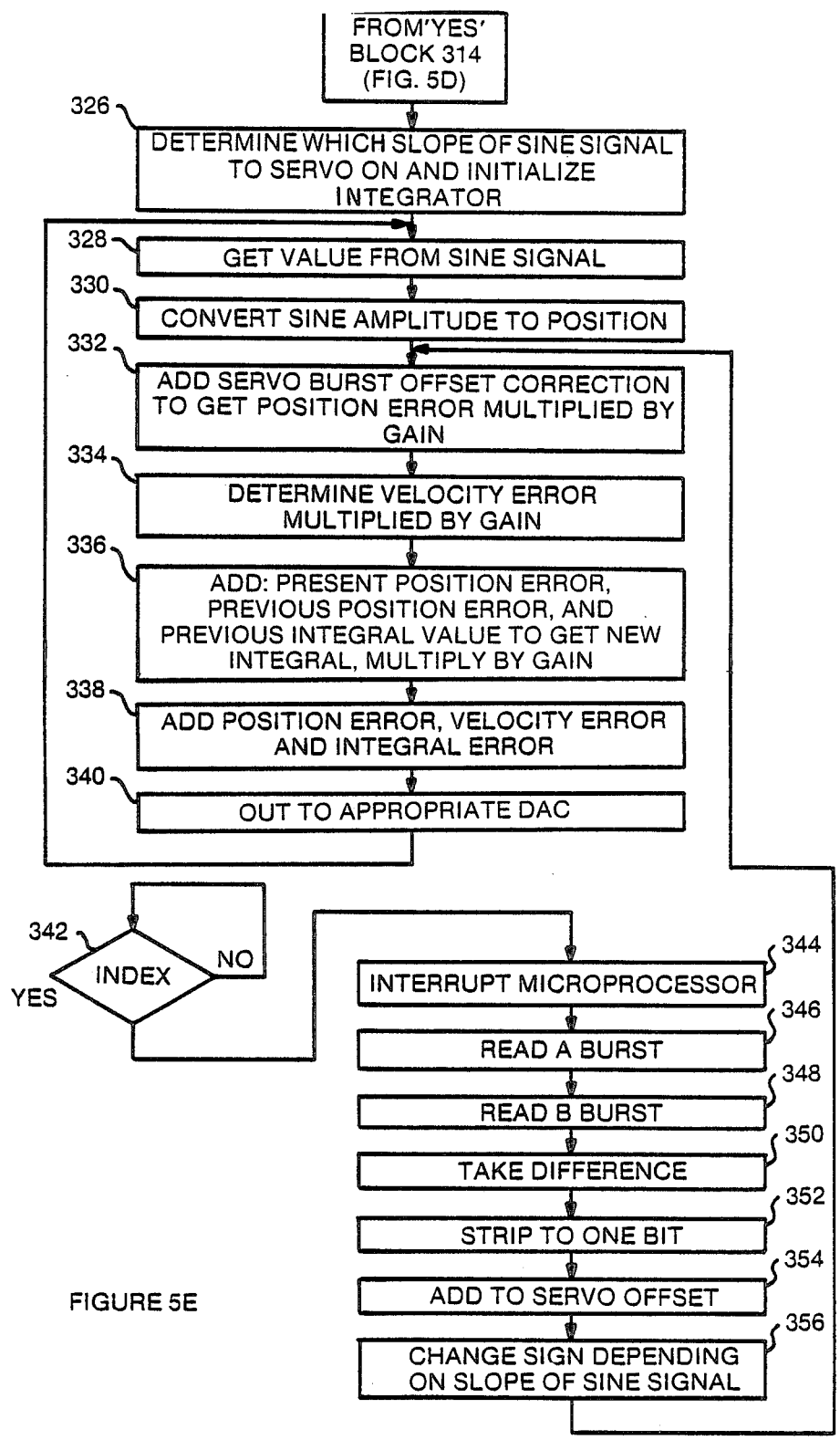

The operations performed in the Detent Mode are illustrated in FIG. 5E. Referring now to FIG. 5E, Microprocessor 10 determines which slope of the sine wave Transducing apparatus 120 is positioned with respect to, and thereafter initiates the integrator in block 326. Thereafter in block 328 position information is determined from the sine signal, and thereafter converted to actual position information in block 330. As was previously discussed, in the Detent Mode of operation, servo burst information is also used with respect to positioning of Transducer apparatus 120. This is necessary to provide position compensation for thermal expansion which may occur with respect to disk 122 (FIG. 1), as previously discussed. Consequently, in block 332 position correction information determined from servo burst detection and processing as previously discussed is added to the position error determined. The position so determined is thereafter multiplied by a gain factor which is empirically determined by parameters associated with a particular design. Thereafter in block 334 the velocity error is determined, and again multiplied by a gain factor as previously discussed. Thereafter in block 336, the present position error, previous position error, and previous integrator value are added to get a new integral value, which is likewise multiplied by a gain factor as previously discussed. Thereafter in block 338, the position error, velocity error and integral error are added, and thereafter coupled to the appropriate digital-to-analog converter in block 340. Thereafter, the preceeding operations are again repeated beginning with block 328.

While in the Detent Mode, servo burst information is monitored. Once each revolution of Disk 122, as indicated by the presence of the Index pulse from Transducer 126, Microprocessor 10 controls Gated Integrator 130 to measure the values of servo bursts 202 and 204 (FIG. 3) on the track over which Transducing apparatus 120 is positioned. The magnitudes of the respective servo bursts are compared and used with previously determined servo burst information to determine servo burst correction. The operations performed by Microprocessor 10 with respect to the processing of the servo burst information are illustrated in FIG. 5E beginning with block 342. In block 342, responsive to the occurrence of an index pulse occurring on terminal 26 of Microprocessor 10 (FIG. 1), Microprocessor 10 is interrupted from its current operation in block 344. Thereafter in block 346 the amplitude of the first servo burst is read by Microprocessor 10, i.e. servo burst 202 (FIG. 3). Thereafter in block 348, the amplitude of the following servo burst is read by Microprocessor 10, i.e., servo burst 204. Microprocessor 10 next determines the difference between the amplitudes of each of the servo bursts in block 350. In the preferred embodiment, only one bit of the resulting difference is used for correction purposes on each reading of the servo bursts. This is done to guard against invalid information corrupting the positioning process. Consequently in block 352, the value determined from block 350 is adjusted to reflect only the least significant bit, which is thereafter added to the servo offset value in block 354. In block 356 the sign is changed as determined by the slope of the sine signal as previously discussed. Thereafter, Microprocessor 10 next performs the sequence of steps previously discussed, starting with block 332.

While the foregoing has provided a detailed description of the operation of the transducer positioning apparatus in accordance with the present invention, yet further detailed information regarding the foregoing described operation is included with the commented assembly language listing of the previously discussed program of Microprocessor 10 in Table 1 hereinbelow.

```
;PENEP12.ASM
;A program to seek and hold a position    on command from
;interface
;Program is for 2 phase positioner motor
;Program uses SERVO BURST DECODING
;
;*****************************************
; First the BASE RAM DEFINITIONS    *
;*****************************************
;
TCSR1:      EQU     8           ;The Timer control/status
                                ; register #1
TCSR2:      EQU     0FH         ;The Timer control/status
                                ; register #2
TIMER:      EQU     9           ;double precision timer/counter
                                ; data address
;
PORT2:      EQU     3
PORT2DIR:   EQU     1
PORT5:      EQU     15H         ;no direction register, all inputs
PORT5CTL:   EQU     14H
PORT6:      EQU     17H
PORT6DIR:   EQU     16H
PORT8:      EQU     38H
PORT9:      EQU     39H
;
ADC:        EQU     20H
SINE:       EQU     11111000B   ;the masks for PORT6 before a
                                ; read from the sensors
COSINE:     EQU     00000001B   ;OR
DAC1:       EQU     29H
DAC2:       EQU     28H
HANDOVER:   EQU     3           ;The number of tracks from destination
                                ; that we handover
                                ; from the fast to slow seek modes
```

```
;----------------------------------------------------
    ORG     40H         ;base of user RAM
;
;*********** The permanent variables definitions *******
SINE.ZERO:   DS    1        ;The predistorted zero offset for
                            ; the sine detector
COSINE.ZERO: DS    1        ; cosine predistorted zero
RAW.SINE:    DS    1        ;The natural zero of the sine
                            ; decoder
SINE.AMPL:   DS    1        ;The binary fraction scaler for
                            ; the A detector output
COSINE.AMPL: DS    1        ; and for the cosine
LINE:        DS    2        ;The line count from reference
                            ; for the position servo
DESTINATION: DS    2        ;the servo loop destination
                            ; (16 bit, 2's C)
INTEGRAL:    DS    2        ;The detent loop running integral
FLAGS:       DS    1        ;A byte of bitwise flags
                   ;BIT0 = QUADRANT #1 FLAG
                   ;BIT1 = QUADRANT #4 FLAG
                   ;BIT2 = SERVOING OFF SINE FLAG
                   ;BIT3 = SERVOING OFF COSINE FLAG
                   ;BIT5 = SEEK DIRECTION
ZM0:         DS    2        ;DIFFENTIATOR VALUES
ZM1:         DS    2
PORT8I:      DS    1        ;IMAGE OF PORT8
PORT9I:      DS    1        ;IMAGE OF PORT9
SLOPE:       DS    1        ;SLOPE OF SINE IN DETENT
SCALE:       DS    1        ;DEMANDED VELOCITY SCALING FACTOR
COMCNT:      DS    2        ;COMMUTATION COUNTER
COMSEQ:      DS    2        ;COMMUTATION POINTER
ZERO1:       DS    1        ;DAC #1 OFFSET CURRENT
ZERO2:       DS    1        ;DAC #2 OFFSET CURRENT
HISPD:       DS    1        ;FAST SEEK MODE VARIBLE
ACCEL:       DS    1        ;FAST SEEK MODE VARIBLE
DACAVG:      DS    2
DETOUT:      DS    2        ;POINTER TO  DAC OUTPUT ROUTINE
                            ; IN DETENT
```

```
;
;*********** Temporary variables definitions ************
TEMP1:      DS      1
TEMP2:      DS      1
TEMP3:      DS      1
TEMP4:      DS      1
TEMP5:      DS      1
TEMP6:      DS      1
TEMP7:      DS      1
TEMP8:      DS      1
TEMP9       DS      1
TEMP10:     DS      1
TEMP11:     DS      1
TEMP12:     DS      1
TEMP13:     DS      1
;
COUNTER:    EQU     TEMP1       ;A scratch location for loop count
CNTR:       EQU     TEMP4
LAST.TIMER: EQU TEMP1
;
SIN.MIN:    EQU     TEMP1       ;used in the detector peak
                                ; calibration
SIN.MAX:    EQU     TEMP2       ;detector calibration
COS.MIN:    EQU     TEMP3       ;detector calibration
COS.MAX:    EQU     TEMP4       ;detector calibration
;
SIGMA.X2:   EQU     TEMP4       ;use 4 bytes for accumulation
                                ; of x^2
;
SINES:      EQU     TEMP5
MSBYTE1:    EQU     TEMP5       ;24 bit storage for the
                                ; accumulated amplitude totals
NSBYTE1:    EQU     TEMP6
LSBYTE1:    EQU     TEMP7
;
MAX.OFFSET: EQU     TEMP8
MIN.OFFSET: EQU TEMP9
;
```

```
COSINES:    EQU     TEMP8
MSBYTE2:    EQU     TEMP8       ;and for the cosine values
NSBYTE2:    EQU     TEMP9
LSBYTE2:    EQU     TEMP10
;
SINE.VAL:   EQU     TEMP1       ;For the lookup routines
COSINE.VAL: EQU     TEMP2
;
DIVIDEND:   DS      3           ;Used in the division routines
DIVISOR:    DS      3           ;
REM:        DS      3
RESULT:     EQU     DIVIDEND    ;Result replaces dividend
SAMPLES:    EQU     DIVISOR     ;the number of samples
                                ; accumulated go into the divisor
;
FRACTION:   EQU     REM         ;TEMP1, TEMP2, TEMP3 also
                                ; destroyed in CONVERT
TOFF:       DS      2
TRKNUM:     DS      2           ;TRACK NUMBER POSITIONER IS AT
FLAG:       DS      1           ;INTERRUPT FLAG
DIR:        DS      1           ;DIRECTION TO MOVE
COUNT1:     DS      2           ;TEMP TIMER STORAGE FOR
                                ; STEP PULSES
SPNTIME0    DS      2           ;SPINDLE SPEED TIME
SPNTIME1    DS      2           ;SPINDLE SPEED TIME
T2RST:      EQU     013H
TIMER2:     EQU     01DH
T2CON:      EQU     01BH
T2CMP       EQU     01CH
IRQ2:       DS      1           ;JUMP INSTRUCTION
INTRPT2:    DS      2
REVCNT:     DS      1           ;REV. COUNTER
LINOFF:     DS      2           ;LINE OFFSET FOR TRACK NUMBER
;
    ORG     0F000H
;**************** INITIALIZATION ********************
START:
    LDA     #0FFH
```

```
        STA     PORT9
                LDSP    #00FFH          ;PLACE STACK AT TOP OF
                                        ; INTERNAL MEMORY
        DI
        LDA     #01000111B      ;ENABLE WAIT
                                        ; AND INTERRUPTS
        STA     PORT5CTL
        CLRA
        CLRB
        STD     TOFF            ;CLEAR OFFSET FOR DETENT
        STA     TCSR1
        STA     TCSR2
        STA     T2CON           ;DISABLE STEP COUNTER
        STA     TEMP13
        LDA     #00000011B      ;MAKE P20 THRU P27 OUTPUTS
        STA     PORT2DIR
        LDA     #0FFH
        STA     PORT6DIR        ;MAKE P60 THRU P67 OUTPUTS
        STA     PORT8
        STA     PORT8I
        STA     PORT9
        STA     PORT9I
        LDA     #10111111B
        STA     PORT2           ;INT PORT2
        LDA     #0
        STA     PORT6
        STA     REVCNT
        LDA     #07EH
        STA     IRQ2            ;PUT A JUMP
                                        ; INSTRUCTION AT IRQ2
        LDA     #80H
        STA     DAC1
        STA     DAC2
;
;******* WAIT FOR SPINDLE UP TO SPEED ******************
;
        LDA     #20H    ;NOW WAIT FOR  2 SECONDS
        LDX     #0
```

```
ZLP81:  DECX
    BNZ     ZLP81
    DECA
    BNZ     ZLP81
;
;
    LDX     #SPNCK      ;SET UP INTERRUPT FOR SPIN CHECK
    STX     IRQ2+1
    CLRA
    CLRB
    STD     TEMP1
    STA     FLAG
    CALL    CLRINT
WAIT:   LDA     #10H            ;WAIT 1 SECOND FOR A
                                ; SPINDLE PULSE
    LDX     #0
WA1:    DECX
    BNZ     WA1
    DECA
    BNZ     WA1
WA3:    TEST    FLAG
    BNZ     WA2
    BR      SPNERR          ;NO INDEX OCCURED
WA2:    ANDTEST #80H,FLAG   ;TEST IF ABOVE 3246 RPM
    BZ      WA3
    DI
    BR      START1
;
SPNERR: LDA     #2
    STA     TEMP1
    JMP     FLASH
;
;********* FIND THE MIN AND MAX OF THE ENCODER *********
;
START1:                 ;RESTARTING POINT
    CLRA
    STA     ZERO1
    STA     ZERO2
```

```
        CALL    HIT.CRASH.STOP
        CLRA                            ;INITIALIZE VARIABLES
        STA     SIN.MAX
        STA     COS.MAX
        CPLA
        STA     SIN.MIN
        STA     COS.MIN
;
        LDA     #3
        STA     TEMP9
FNDMM:  CALL    DECOM2
        CALL    CAL1
        DEC     TEMP9
        BNZ     FNDMM
;
;******** FIND THE AVERAGE VALUE & SCALING FACTORS *****
;
        LDA     SIN.MAX
        LDB     SIN.MIN
        SUBAB
        SRLA                            ; /2
        STA     SINE.AMPL       ;PEAK AMPLITUDE
        ADDAB
        STA     RAW.SINE        ;AVG VALUE
;
        LDA     COS.MAX
        LDB     COS.MIN
        SUBAB
        SRLA
        STA     COSINE.AMPL     ;PEAK AMPLITUDE
        ADDAB
        STA     COSINE.ZERO     ;AVG VALUE
        BR      CONT1
;
RESTART:                        ;ALLOW 3 TRIES TO CALIBRATE
                                ;  POSITIONER SYSTEM
        LDA     TEMP13
        INCA
```

```
        CMPA      #4
        BE        ERROR10
        STA       TEMP13
        JMP       START1
ERROR10:
        LDA       #3
        STA       TEMP1
        JMP       FLASH
;
;At manufacture, need to check that it is > 40
; (sufficiently large)
;Due to the fact that we dont have a signed multiply
; the detector zeroes have to be predistorted so that
; we can subtract after the multiply so
; that (V - ZERO) * AMPLITUDE FRACTION becomes
; (V * AMPLITUDE FRACTION) - (ZERO * AMPLITUDE FRACTION)
; which is an unsigned multiplication operation.
;Now, the largest base-peak we can get is 80H
; (corresponds to 5.0 Volts p-p)
; The smallest we can handle is limited by dynamic
; range considerations to 40H (1.25 Volts) (=2.5 Vp-p)
;Thus we will scale the measured voltage until the
; base-peak value becomes 40H (2.50 Volts) and give
; error on overflows (poor hardware)
CONT1:   LDB      SINE.AMPL       ;get the
                                  ; base-peak amplitude
        CLRA                      ;use ACCD
        STD       DIVIDEND
        LDB       #40H            ;scale to 1.25 volts
        STD       DIVISOR
        CALL      CONVERT         ;convert to a binary
                                  ; fraction
;On return fraction is the mutiplier for sensor output
; needed to normalize
; the base-peak amplitude to 1
        LDA       FRACTION        ;Is the result greater
                                  ; than 1 (output too low)
        CMPA      #0FFH
```

```
        BE      ABORT               ;if so, abort
        STA     SINE.AMPL           ;but if ok save
                                        ; the fraction LDB     RAW.SINE            ;scale the zero
        MUL
        STA     SINE.ZERO           ;for later use
;now the cosine
        LDB     COSINE.AMPL         ;get the
                                        ; base-peak amplitude
        CLRA                        ;use ACCD
        STD     DIVIDEND
        LDB     #40H                ;scale to 1.25 volts
        STD     DIVISOR
        CALL    CONVERT             ;convert to a
                                        ; binary fraction
;On return fraction is the mutiplier for sensor output
; needed to normalize the base-peak amplitude to 1
        LDA     FRACTION            ;Is the result greater
                                        ; than 1 (output too low)
        CMPA    #0FFH
        BE      ABORT               ;if so, abort
        STA     COSINE.AMPL         ;but if ok save
                                        ;.the fraction
        LDB     COSINE.ZERO         ;scale the zero
        MUL
        STA     COSINE.ZERO         ;for later use
;
        BR      FNDOFF
;
ABORT:  JMP     RESTART
;
CAL1:   LDX     #0A639H
LP12:   LDB     PORT6
        ANDB    #SINE
        STB     PORT6               ;LOOK AT SINE ENCODER
        LDA     ADC
        INC     PORT6               ;LOOK AT COSINE ENCODER
        LDB     ADC
        CMPA    SIN.MAX
```

```
        BLS     NXT4
        STA     SIN.MAX
NXT4:   CMPA    SIN.MIN
        BH      NXT5
        STA     SIN.MIN
NXT5:   CMPB    COS.MAX
        BLS     NXT6
        STB     COS.MAX
NXT6:   CMPB    COS.MIN
        BH      NXT7
        STB     COS.MIN
NXT7:   DECX                        ;COUNT DOWN THE LOOP
        BNZ     LP12
        RET
;
;******* FIND THE OFFSET CURRENT FOR DACS 1 & 2 ********
;
FNDOFF: CALL    FNDNUL
        LDX     COMSEQ
        INCX                        ;INC. COMMUTATION POINTER
        STX     COMSEQ
;
        CALL    DETAVG              ;FIND THE AVG
                                    ; VALUE IN DETENT
        SUBA    #80H                ;GET THE CURRENT OFFSET
        STA     ZERO1               ;SAVE THE CURRENT OFFSET
        STA     ZERO2
;
        CALL    DECOM               ;COMMUTATE TO
                                    ; THE NEXT NULL
        LDX     LINE
        CMPX    #161                ;DETERMINE DIRECTION
        BH      GETC1
        CALL    DECOM
        BR      GETOFF
GETC1:  CALL    INCOM
;
GETOFF: LDX     COMSEQ
```

```
        INCX                    ;INC COMMUTATION POINTER
        STX     COMSEQ
        CALL    DETAVG          ;FIND THE AVG VALUE
                                ;   IN DETENT
        SUBA    #80H            ;GET THE CURRENT OFFSET
        LDX     COMSEQ
        ANDTEST #1,0,X          ;SAVE CURRENT OFFSET
        BZ      DC1OFF
        STA     ZERO2
        JMP     BEGIN
DC1OFF: STA     ZERO1
        LDX     #0
        STX     TOFF
        JMP     BEGIN
;
; FIND THE AVERAGE DAC VALUE IN DETENT
;
DETAVG:
        LDD     #4000H
        STD     TEMP9           ;GET SUM OF 200 DAC
                                ;    OUTPUTS
        CALL    CALDET
        LDD     #0
        STD     DACAVG
        LDD     #400
        STD     TEMP9
        CALL    CALDET          ;"DACAVG" = SUM
;
        CLRA                    ;CALCULATE THE AVG
                                ;  OUTPUT TO THE DAC
        LDX     DACAVG
        STX     DIVIDEND+1
        STA     DIVIDEND
        LDX     #400
        STX     DIVISOR+1
        STA     DIVISOR
        CALL    DIVIDE
        LDA     DIVIDEND+2      ;A = "DACAVG" / 400
```

```
        LDX     REM+1
        CMPX    #400/2
        BL      RNDOFF
        INCA
RNDOFF: RET
;
;********** DENTENT POSITIONING LOOP FOR CALIBRATION ***
;
CALDET: AND     #0E7H,PORT6
        CALL    GET.SIN.COS
        CLRA
        TEST    TEMP2
        BN      SVSLP           ;NEGATIVE SLOPE ?
        INCA
SVSLP:  STA     SLOPE
        LDB     PORT6
        ANDB    #SINE
        STB     PORT6
;
CLDET:  LDX     #FINE.TABLE
        LDB     ADC
        LDA     SINE.AMPL
        MUL
        SUBA    SINE.ZERO
        BN      NEGVL           ;NEGATIVE RESULT ?
        MOVBA
        ADDXB
        LDB     0,X
        LDA     SLOPE
        BNZ     POSSLP          ;POSITIVE SLOPE ?
        NEGB
POSSLP: BR      CLDET2
;
NEGVL:  NEGA
        MOVBA
        ADDXB
        LDB     0,X
        LDA     SLOPE
```

```
        BZ      CLDET2              ;NEGATIVE SLOPE ?
        NEGB
;
CLDET2: CLRA
        TESTB
        BP      ADDOF
        CPLA
ADDOF:  ADDD    TOFF                ;ADD POSITION OFFSET
;
        STD     ZM0                 ;SAVE POSITION ERROR
        SUBD    ZM1                 ;SUBTRACT PREVIOUS
                                    ; POSITION ERROR
        SLAB
        SLAB
        SLAB
        STB     TEMP7               ;SAVE VELOCITY ERROR
        LDD     ZM0
        ADDD    ZM1
        ADDD    INTEGRAL
        STD     INTEGRAL
        ADDA    TEMP7               ;VELOCITY + (INTEGRAL/256)
        STA     TEMP7               ;SAVE
        LDD     ZM0                 ;SCALE THE POSITION ERROR
        STD     ZM1
        ADDB    TEMP7               ;POSITION + VELOCITY
                                    ;  + INTEGRAL
;
        LDX     COMSEQ              ;COMMUTATION POINTER
        XORB    #80H
        LDA     #80H
        ANDTEST #80H,0,X
        BZ      CLDET3              ;SELECT CURRENT DIRECTION
        NEGB
CLDET3: ANDTEST #1,0,X
        BZ      CLDET4              ;SELECT DAC
        STA     DAC1
        STB     DAC2
        BR      CLDET5
```

```
CLDET4:    STA     DAC2
    STB     DAC1
;
CLDET5:    LDX     DACAVG
    ADDXB
    STX     DACAVG
    LDD     #4
    ANDTEST #10H,TEMP9+1
    BZ      CLDET6
    LDD     #-4
CLDET6:    STD     TOFF
;
    LDX     TEMP9
    DECX
    STX     TEMP9
    BNZ     CLDET7
    RET
;
CLDET7:    JMP     CLDET
;
;********** SEEK SUBROUTINE *********************
;
SEEK:
    DI
    LDD     #-(HANDOVER*64*4) ;the initial position
                              ; error <--double
    STD     ZM1     ;initialize the differentiator
;
;       FIND THE CURRENT TRACK # FROM LINE COUNT
;           AND QUADRANT #
;
    CALL    UPDATE.LINE     ;UPDATE LINE COUNT
    LDD     LINE
    ANDTEST #2,FLAGS
    BZ      CALT1           ;IN THE 4TH QUADRANT ?
    ADDD    #1              ;IF YES INC LINE COUNT
CALT1:    SLAD                      ;2 * LINE COUNT
    ANDTEST #3,FLAGS
```

```
    BNZ       CALT2              ;IN 2ND OR 3RD QUADRANT ?
    ADDD      #1                 ;IF YES INC TRACK COUNT
CALT2:  STD   TEMP3
;
    LDD       DESTINATION        ;DESTINATION = DESTINATION
                                 ;   TRACK #
    SUBD      TEMP3              ;TEMP3 = # OF TRACKS TO
                                 ;   DESTINATION
    BP        TSTPOS
;
    CPLA                         ;2'S COMP
    CPLB
    ADDD      #1
    STD       TEMP3
    ANDTEST   #20H,FLAGS         ;REVERSE DIRECTION
                                 ;   ALREADY SET ?
    BNZ       ISKP2
    OR        #20H,FLAGS
    BR        ISKP2
;
TSTPOS: STD   TEMP3
    ANDTEST   #20H,FLAGS         ;FOWARD DIRECTION
                                 ;   ALREADY SET ?
    BZ        ISKP2
    AND       #0DFH,FLAGS
ISKP2:
    LDX       TEMP3
    CMPX      #HANDOVER ;for compare
    BH        NXT46     ;if too many tracks from home
                        ;   then do fast seek
    JMP       NXT140    ;else go do slow seek alone
                        ;   (no LINE adjustment done)
NXT46:
    DECX
        STX   TEMP3
                        ;FASTSEEK quits #HANDOVER
                        ;  tracks before it
;OK, now we must suck up the first line intelligently.
```

;We work out whether we are in the first or second half
; line and adjust the LINE count to reflect its state
; at the end of the FASTSEEK, then go monitor the
; signum of the cosine until it changes. When that
; happens we can safely look for a zero crossing
; without the risk that we are straddling one
; (as a cosine signum change occurs near the peak of
; the sinusoid, and we will be servoing  off the slope

```
        INCX                        ;INCLUDE THE DROPPED
                                    ; CROSSING
        EXDX
        SUBD    #HANDOVER           ;LESS THE # TRACS IN
                                    ; SLOW SEEK MODE
        SRLD                        ; / 2 FOR # OF LINES
        ANDTEST #20H,FLAGS          ;DIRECTION ?
        BNZ     NXT48
;
        ANDTEST #1,FLAGS            ;IN QUADRANTS 2,3, OR 4 ?
        BNZ     NXT47
        BNC     NXT47               ;IF THERE IS A CARRY
                                    ; ADD IT TO
        ADDD    #1                  ;THE LINE COUNT
NXT47:  ADDD    LINE                ;FIND THE VALUE OF THE
                                    ; LINE COUNT AT
        STD     LINE                ;THE END OF THE FAST
                                    ; SEEK & AND SAVE IT
        BR      NXT50
;
NXT48:  ANDTEST #2,FLAGS            ;IN QUADRANTS 1,2, OR 3 ?
        BNZ     NXT49
        BNC     NXT49               ;IF THERE IS A CARRY ADD
                                    ; IT TO
        ADDD    #1                  ;THE LINE COUNT
NXT49:  SUBD    LINE                ;FIND THE VALUE OF THE
                                    ; LINE COUNT AT
        CPLA                        ;THE END OF FAST SEEK &
                                    ; SAVE IT
        CPLB
```

```
        ADDD      #1                  ;REVERSE THE POLARITY OF
                                      ; THE SUBTRACTION
        STD       LINE
;
NXT50:  LDA       #0FFH
        STA       SCALE               ;LONG SEEK SCALING FACTOR
        CLR       ACCEL
        LDB       #0F0H
        LDX       TEMP3
        CMPX      #40
        BH        LDAC
;
        LDA       #0FFH    ;SHORT SEEK SCALING FACTOR
        STA       SCALE
        INCX
        EXDX
        SRLB               ; / 2
        ADDB      #1
        STB       ACCEL
        LDB       #090H
;
LDAC:   ANDTEST   #20H,FLAGS          ;DIRECTION ?
        BNZ       LDAC1
        NEGB
LDAC1:  CALL      OUTDAC
        CALL      GET.COSINE.SIGNUM.CHANGE
;
;----------------------- FAST SEEK MODE -----------------
;We will seek for TEMP3-4 'tracks'
;TEMP1,2 hold the timer value last time round the loop
;TEMP3,4 hold the number of half sines TO DESTINATION
;TEMP5 holds the signum function of the last half sine
;TEMP6,7 are used as a temporary double precision
;   storage location
;TEMP9,10 are the detent loop timeout
;
;Proceedure:
; We will monitor the zero crossings on one sensor.
```

```
; Every signum change we will sample the timer and use
; that value to derive a motor drive voltage
;   (For the first 1/2 of the seek we will limit the
;    seek speed to 10.8ips)
; We will decrement the count in TEMP3 until it is zero
; Seek pulse interrupts will only be allowed during the
; first half of the seek.
; Pulses in the second half will only be processed after
; we have reached our destination 'track'
;
    CLR     HISPD
    LDX     #1
    CALL    GETCOM      ;UPDATE COMMUTATION POINTER
;
    LDA     PORT6       ;and the mask must be retained
                        ; for the duration of
    ANDA    #SINE       ;fast seek routine
    STA     PORT6
;In order for the fast seek loop to have been invoked
; the despatcher has determined that a finite minimum #
; of tracks has been asked for
;So we can do one loop at high velocity before
; recalculating the table value
;Read the sine detector and loop until we get the first
; signum change
    LDA     ADC         ;read the sine sensor
    LDB     RAW.SINE    ;and subtarct the raw zero to
                        ; give us signum SUBAB
    BN      WAIT.FOR.POSITIVE
WAIT.FOR.NEGATIVE:       ;else...
    LDA     ADC         ;read the sine sensor
                                ;7
    SUBAB               ;and subtract the raw zero to
                        ; give us signum   ;1
    BP      WAIT.FOR.NEGATIVE
                ;3
    STA     TEMP5       ;but if signum has changed
```

```
                            ; store it
                              ;3
    BR      NXT42
                              ;3
WAIT.FOR.POSITIVE:
    LDA     ADC       ;read the sine sensor
                              ;7
    SUBAB             ;and subtract the raw zero to
                      ; give us signum   ;1
    BN      WAIT.FOR.POSITIVE
                              ;3
    STA     TEMP5     ;but if signum has changed
                      ; store it              ;3
NXT42:            ;OK, we have a signum change, sample the timer
                  ; and wait for the next
    LDD     TIMER     ;read the free running counter
                              ;4
    STD     TEMP1     ;save it so we can get the
                      ; interval later   ;4
    LDX     TEMP3
    CMPX    #HANDOVER
    BZ      FIX4      ;DONE FAST SEEK ?
LP10:   LDA     HISPD
    BZ      OLDLP
;
; IF SEEK VELOCITY IS GREATER THAN 6.7 IPS THEN
;       MEASURE THE PERIOD OF EVERY TWO TRACK CROSSINGS
;
    LDX     #2        ;UPDATE COMMUTATION POINTER
    CALL    GETCOM
    LDB     RAW.SINE
    LDA     TEMP5
    BN      POS.TO.NEG
;
NEW1:   LDA     ADC                 ;STILL POSITIVE CYCLE ?
    SUBAB
    BP      NEW1
    LDX     #10                     ;20 USEC DELAY
```

```
DLY1:      DECX
   BNZ     DLY1
;
NEW2:      LDA     ADC             ;WAIT FOR NEG TO POS
                                   ;  TRANSITION
   SUBAB
   BN      NEW2
   BR      NEW3
;
POS.TO.NEG:
NEW4:      LDA     ADC             ;STILL NEG CYCLE ?
   SUBAB
   BN      NEW4
   LDX     #10                     ;20 USEC DELAY
DLY2:      DECX
   BNZ     DLY2
;
NEW5:      LDA     ADC             ;WAIT FOR POS TO
                                   ; NEG TRANSITION
   SUBAB
   BP      NEW5
;
NEW3:      LDD     TIMER
   LDX     TIMER
   SUBD    TEMP1
   STX     TEMP1                   ;SAVE TIMER VALUE
   SRLD                            ; / 2
;
   LDX     TEMP3
   DECX
   BR      NXT135
;
FIX4:      JMP     NXT139
;
; IF SEEK IS LESS THAN 6.7 IPS THEN MEASURE THE
; PERIOD OF EVERY TRACK CROSSING
;
OLDLP:     LDX     #1              ;UPDATE
```

```
                                    ; COMMUTATION POINTER
        CALL    GETCOM
        LDB     RAW.SINE            ;PRE-STASH FOR FAST
                                    ; SUBTRACTION
        LDA     TEMP5       ;OK, get the last signum and
                            ;brach accordingly          ;3
        BN      WAIT.FOR.NXT.POSITIVE
                            ;3
WAIT.FOR.NXT.NEGATIVE:      ;else...
    LDA     ADC         ;read the sine sensor
                        ;7
    SUBAB               ;and subtract the raw zero to
                        ; give us signum   ;1
    BP      WAIT.FOR.NXT.NEGATIVE
                        ;3
    BR      NXT43
                        ;3
WAIT.FOR.NXT.POSITIVE
    LDA     ADC         ;read the sine sensor
                        ;7
    SUBAB               ;and subtract the raw zero
                        ; to give us signum    ;1
    BN      WAIT.FOR.NXT.POSITIVE
                        ;3
NXT43:
    STA     TEMP5
    LDD     TIMER
    LDX     TIMER
    SUBD    TEMP1
;
    STX     TEMP1
    LDX     TEMP3
;
;At 10.8 ips we have a 92.6Usec interval
; here(count=193),at 1/2ips we have 4000/16 gives 12
; to 250 as our range of values (when we look up 12
; we get 122)
;/128 gives 1 to 31 as our range,but we will only
```

```
; use it from 8 to 31
;
NXT135:    DECX
    STX     TEMP3
    CMPX    #HANDOVER
    BZ      FIX4              ;DONE FAST SEEK ?
    EXDX
    CLR     HISPD
    CMPX    #300
    BH      NHISPD
    CPL     HISPD
NHISPD:    EXDX
;
    LDX     #INVERSE.TABLE    ;point to the
                              ; inversion table
            SRLD    ;/2
                                        ;1
    SRLD    ;/4
                                        ;1
    TESTA   ;see if number is going to be in
                              ;range of raw table
                              ;1
    BNZ     COARSE.INVERSE    ;if not go
                              ; another path
            ;3
    SRLD    ;/8
                              ;1
    SRLD    ;/16                        ;1
;We have the displacement in B  12< B <64
    ADDXB                     ;add in the offset
                              ;1
    LDB     0,X               ;get the inverse (0-80H)
                              ;4
    BR      NXT40             ;then go process it
                                        ;3
;
COARSE.INVERSE:
    SRLD    ;/8
```

```
                    ;1
    SRLD     ;/16
                    ;1
    SRLD     ;/32
                    ;1
    SRLD     ;/64
                    ;1
    SRLD     ;/128, max is 32, min 8
                    ;1
    CMPB     #65      ;is it in range of the table?
                                     ;2
    BL       NXT38
                    ;3
;If the motor acceleration is slow then the SWI here
; may be activated too much
    JMP      RESTART           ;JUMP ON OVERFLOW
NXT38:
    ADDXB                      ;add in the offset
                                     ;1
    LDB      0,X               ;get the
                               ; inverse*8 (0-183)
                                     ;4
    SRLB                       ;scale it to *1
                                     ;1
    SRLB                       ;scale it to *1
                                     ;1
    SRLB                       ;scale it to *1
                                     ;1
NXT40:
    CLRA     ;save it in double precision
            ;1
    STD      TEMP6    ;save the current speed awhile
            ;3
;We wish to servo to the value Vc=9.55 Xc ^0.65
; Where Xc is the distance left to go (in tracks)
    LDX      TEMP3    ;get the number of half tracks
                      ; remaining            ;4
    CMPX     #108     ;tracks out from home to start
```

```
                              ; deceleration    ;3
    EXDX
                                                        ;1
    BL      COARSE    ;if not, look it up
                      ;3
    LDB     #127      ;MAX SPEED (12.0 IPS)
    BR      NXT44
                                                        ;3
;
COARSE:
;We now want to multiply the track number by a constant
; to fine tune profiles
    CMPB    #40       ;if its less than 16 go
                      ; to precise table              ;2
    BL      FINE.PROFILE
                                      ;3
    SRLB              ;divide it by 2
                      ; (get to lookup index)          ;1
    LDX     #COARSE.PROFILE.TABLE  ;the table of
                                ;velocity vs tracks*2 left;3
    ADDXB
                                                        ;1
    LDB     0,X       ;get the speed servo value
                      ;4
    BR      NXT44
            ;3
FINE.PROFILE:
;Would be best to place this earlier, to
; affect both loops
    SUBB    #1        ;trim the handover
                      ; region profile
    LDX     #FINE.PROFILE.TABLE  ;the table of
                                ;velocity vs tracks left;3
    ADDXB
                                                        ;1
    LDB     0,X       ;get the speed servo value
                      ;4
;
```

NXT44:
```
        CLRA
                        ;1
  SUBD      TEMP6     ;servo our speeds
                        ;4
;
;If the speed is less than the desired value we will
; get a +ve number here
; That indicates that we must increase the motor voltage
; going this direction
; For negative results we must decrease it
;We must add it to ZERO if we are going in this direction
   SLAD         ;apply gain *2
                                ;1
  SLAD       ;*4
                                    ;1
  SLAD
;OK, now have the velocity error, servo it with
; the motor zero
;WE MUST SEE WHAT DIRECTION WE ARE TRAVELLING IN
   ANDTEST  #00100000B,FLAGS ;Use FLAGS
                        ;for the purpose        ;4
   BNZ       IN2      ;if it is zero we are
                        ;moving towards fiduciary
                        ;3
   CPLA              ; ,negate the error signal
                        ;1
   CPLB
                                ;1
   ADDD      #1
                                ;3
```
;If we are going too fast +ve we need to lower the
; DAC value and if it goes -ve
; we need to set the -ve direction
;Now the max +ve or smallest -ve must not overflow the
; addition even for
; extremes of motor zero offset excursions.
;

```
IN2:
   TEST    ACCEL
   BZ      IN22
   DEC     ACCEL
   BR      CLMP2
;
IN22:      TESTA
   EXDX
   BP      FNXT80              ;POS OR NEG ERROR ?
;
   CMPX    #0FF90H
   EXDX
   BH      FNXT81
   LDB     #90H                ;CLAMP  NEG VALUE
   BR      FNXT81
;
FNXT80:    CMPX    #70H
   EXDX
   BL      FNXT81
   LDB     #70H                ;CLAMP POS VALUE
   BR      FNXT81
;
CLMP2:     TESTA
   EXDX
   BP      CNXT80
;
   CMPX    #0FFF0H
   EXDX
   BH      FNXT81
   LDB     #0F0H    ;CLAMP  NEGATIVE VALUE (.15 A MAX)
   BR      FNXT81
;
CNXT80:    CMPX    #10H
   EXDX
   BL      FNXT81
   LDB     #10H                ;CLAMP POS VALUE
                               ; (.15 A MAX)
;
```

```
FNXT81:   XORB      #80H
          LDA       #80H
          LDX       COMSEQ              ;COMMUTATION POINTER
          ANDTEST   #80H,0,X
          BZ        FNXT82              ;SELECT CURRENT DIRECTION
          NEGB
FNXT82:   ANDTEST   #1,0,X
          BZ        FNXT83              ;SELECT DAC (80H TURNS
                                        ; DAC OFF)
          ADDA      ZERO1               ;ADD DAC1 OFFSET CURRENT
          STA       DAC1
          ADDB      ZERO2               ;ADD DAC2 OFFSET CURRENT
          STB       DAC2
          JMP       LP10
FNXT83:   ADDA      ZERO2               ;ADD DAC2 OFFSET CURRENT
          STA       DAC2
          ADDB      ZERO1               ;ADD DAC1 OFFSET CURRENT
          STB       DAC1
          JMP       LP10    ;loop until done the correct
                                        ; number of half-sines ;3
;
NXT139:   ;done fast seek, wait till well beyond sine
          ;zero noise region
;Actually, the delay below is adequate
; CALL     GET.COSINE.SIGNUM.CHANGE ;then drop thru
; to slow seek
;We cannot afford much discontinuity in the
; velocity profile
; We must therefore calculate how much distance there
; is to go and then
; get the table scaling factor to ensure we will
; be at 0 after it.
;Now the table has 42 entries for trk#, with velocity
; programs from 0 to 51
;We should now be travelling at 51 units, lets work out
; the remaining distance
NXT140:
;First adjust the destination to reflect our greater
```

; accuracy detent position
;*
```
  CALL    GETCOM
  LDD     DESTINATION
  MOVAB                      ; * 256
  CLRB
  STD     DESTINATION
```
;*
;*****SLOW SEEK ROUTINE**************************
;*
; GET FINE POSITIONNING INFORMATION
;*
```
LP40:   LDX     #FINE.TABLE
  CALL    GET.SIN.COS
  LDD     TEMP1
  TESTA
  BN      QUAD3
```
;*
```
QUAD1:  TESTB
  BN      QUAD2
  CMPAB
  BL      SIN1              ;SERVO ON SINE OR COSINE ?
```
;*
```
  OR      #8,FLAGS          ;SET COSINE FLAG
  ADDXB
  LDB     0,X
  NEGB
  ADDB    #128              ;127 - B
  CLRA                      ;1ST QUADRANT OFFSET
  JMP     FNXT60
```
;*
```
SIN1:   OR      #5,FLAGS          ;SET QUADRANT #1 &
                                  ; SINE    FLAG
  ANDTEST #2,FLAGS          ;COMING FROM THE 4TH
                                  ; QUADRANT ?
  BZ      SIN1C
  AND     #0FDH,FLAGS       ;RESET QUADRANT #4 FLAG
  LDX     LINE
```

```
        INCX
        STX     LINE
        LDX     #FINE.TABLE
SIN1C:  MOVBA                           ;USE SINE ENCODER INPUT
        ADDXB
        LDB     0,X
        CLRA                            ;1ST QUADRANT OFFSET
        BR      FNXT60
;*
QUAD2:  AND     #0FCH,FLAGS             ;RESET QUADRANT FLAGS
        NEGB
        CMPAB                           ;SIN < COS ?
        BL      SIN2
;*
        OR      #8,FLAGS                ;SET COSINE FLAG
        ADDXB
        LDB     0,X
        ADDB    #128                    ;B + 128
        CLRA                            ;2ND QUADRANT OFFSET
        BR      FNXT60
;*
SIN2:   OR      #4,FLAGS                ;SET SINE FLAG
        MOVBA
        ADDXB
        LDB     0,X
        CLRA                            ;2ND QUADRANT OFFSET
        CPLB
        ADDD    #1                      ;256 - B
        BR      FNXT60
;*
QUAD3:  TESTB
        BP      QUAD4
        AND     #0FCH,FLAGS             ;RESET QUADRANT FLAGS
        NEGA
        NEGB
        CMPAB                           ;SIN < COS ?
        BL      SIN3
;*
```

```
        OR        #8,FLAGS           ;SET COSINE FLAG
        ADDXB
        LDB       0,X
        NEGB
        ADDB      #128               ;128 - B
        LDA       #1                 ;3RD QUADRANT OFFSET
        BR        FNXT60
;*
SIN3:   OR        #4,FLAGS           ;SET SINE FLAG
        MOVBA
        ADDXB
        LDB       0,X
        LDA       #1                 ;3RD QUADRANT OFFSET
        BR        FNXT60
;*
QUAD4:  NEGA
        CMPAB                        ;SERVO ON SINE OR COSINE ?
        BL        SIN4
;*
        OR        #8,FLAGS           ;SET COSINE FLAG
        ADDXB
        LDB       0,X
        ADDB      #128               ;B + 128
        LDA       #1                 ;4TH QUADRANT OFFSET
        BR        FNXT60
;*
SIN4:   OR        #6,FLAGS           ;SET QUADRANT #4 &
                                     ; SINE    FLAG
        ANDTEST   #1,FLAGS           ;COMING FROM THE 1ST
                                     ; QUADRANT ?
        BZ        SIN4C
        AND       #0FEH,FLAGS        ;RESET QUADRANT #1 FLAG
        LDX       LINE
        DECX
        STX       LINE
        LDX       #FINE.TABLE
SIN4C:  MOVBA
        ADDXB
```

```
    LDB     0,X
    NEGB                    ;256 - B
    LDA     #1              ;4TH QUADRANT OFFSET
;*
FNXT60: STD   TEMP3
    LDA     LINE+1          ;* 256  (MSBYTE = LSBYTE)
    CLRB
    SLAD                    ;* 2
    ADDD    TEMP3
;*
    SUBD    DESTINATION
    STD     ZM0
    BP      POS1
    CPLA                    ;MAKE DISPLACEMENT
                            ; POSITIVE
    CPLB
    ADDD    #1
;*
POS1:   SRLD                ;/ 16 (/ 64 UIN.)
    SRLD
    SRLD
    SRLD
;*
    EXDX                    ;IS THERE A TRANSITION
                            ;   FROM SINE TO
    LDA     FLAGS           ;COSINE OR COSINE
                            ;   TO SINE ?
    CPLA
    ANDA    #0CH
    BZ      DISCARD         ;BOTH SINE & COSINE
                            ; FLAGS SET ?
;*
    CMPX    #3              ;COMPARE
                            ; <----*** CARE
                            ; NEEDED HERE***
    BL      DENT            ;WITHIN 64 UIN. ?
                            ;(64 UIN./BIT)
    EXDX
```

```
;*
GTVEL:    LDX       #LOW.VELOCITY
   ADDXB                           ;ADD OFFSET
   LDB       0,X                   ;GET DESIRED VELOCITY
;*
   LDA       SCALE
   MUL
   ANDTEST   #20H,FLAGS            ;POSITIVE OR NEGITIVE
                                   ;   ERROR
   BZ        NXT35
   NEGA
NXT35:    STA       TEMP5          ;SAVE DESIRED VELOCITY
   LDD       ZM0                   ;CURRENT POSITION ERROR
   SUBD      ZM1                   ;SUBTRACT PREVIOUS
                                   ;   POSITION ERROR
   LDX       ZM0
   STX       ZM1                   ;SAVE POSITION ERROR
;*
   SUBB      TEMP5                 ;VELOCITY ERROR
   BP        CLPOS
   CMPB      #0E4H                 ;CLAMP   NEGATIVE VALUE
   BH        FSTGN
   LDB       #0E4H
   BR        FSTGN
CLPOS:    CMPB      #01CH          ;CLAMP   POSITIVE VALUE
   BL        FSTGN
   LDB       #01CH
FSTGN:    SLAB
   SLAB
   LDX       COMSEQ                ;COMMUTATION POINTER
   XORB      #80H
   LDA       #80H
   ANDTEST   #80H,0,X
   BZ        NXT80                 ;SELECT CURRENT DIRECTION
   NEGB
NXT80:    ANDTEST   #1,0,X
   BZ        NXT81                 ;SELECT DAC
   ADDA      ZERO1                 ;ADD DAC1 CURRENT VALUE
```

```
        STA      DAC1
        ADDB     ZERO2                  ;ADD DAC2 CURRENT VALUE
        STB      DAC2
        JMP      LP40
NXT81:  ADDA     ZERO2                  ;ADD DAC2 CURRENT OFFSET
        STA      DAC2
        ADDB     ZERO1                  ;ADD DAC1 CURRENT OFFSET
        STB      DAC1
        JMP      LP40
;*
DISCARD: LDD     ZM0
        STD      ZM1                    ;SAVE POSITION ERROR
        AND      #0F3H,FLAGS            ;RESET SINE & COSINE FLAGS
        JMP      LP40
;*
;*******DETENT POSITIONNING LOOP***********************
;*
DENT:   LDD      ZM0
        STD      ZM1
        CALL     GET.SIN.COS
        CLRA
        CLRB
        STD      INTEGRAL
        STA      FLAG
        TEST     TEMP2
        BN       STSLP
        INCA
STSLP:  STA      SLOPE
;*
; SAVE A POINTER TO THE DAC OUTPUT ROUTINE
;*
        LDX      COMSEQ                 ;GET COMMUTATION POINTER
        ANDTEST  #1,0,X
        BZ       SLDAC2                 ;SELECT DAC #1 OR #2 ?
        LDD      #DTOUT1
        ANDTEST  #80H,0,X
        BNZ      SVPTR                  ;SELECT CURRENT DIRECTION
        LDD      #DTOUT2
```

```
        BR       SVPTR
;*
SLDAC2: LDD      #DTOUT3
        ANDTEST  #80H,0,X
        BNZ      SVPTR             ;SELECT CURRENT DIRECTION
        LDD      #DTOUT4
SVPTR:  STD      DETOUT            ;SAVE DAC OUTPUT POINTER
;*
        LDA      #80H              ;TURN OFF BOTH DAC'S
        ADDA     ZERO1
        STA      DAC1
        LDA      #80H
        ADDA     ZERO2
        STA      DAC2
;
        LDD      #075              ;LOOP MANY TIMES AFTER
                                   ; SEEK TO SETTLE
        BR       DENT1
DETENT:
        LDD      #12
DENT1:  STD      TEMP9
        LDB      PORT6
        ANDB     #SINE
        STB      PORT6
;
;*
;*
; MAIN DETENT POSITIONING LOOP
;*
; DETENT LOOP TIME = 64 USEC.
; VELOCITY GAIN = 16
; INTEGRAL GAIN = 1/256
; POSITION ERROR GAIN = 1
;*
DLP40:  LDX      #FINE.TABLE
        LDB      ADC
        LDA      SINE.AMPL
        MUL
```

```
        SUBA    SINE.ZERO
;*
   BN      NEGVAL              ;NEGATIVE RESULT ?
   MOVBA
   ADDXB
   LDB     0,X
   LDA     SLOPE
   BNZ     POSLP               ;POSITIVE SLOPE ?
   NEGB
POSLP:     BR      FNXT90
;*
NEGVAL:    NEGA
   MOVBA
   ADDXB
   LDB     0,X
   LDA     SLOPE
   BZ      FNXT90              ;NEGATIVE SLOPE ?
   NEGB
;*
FNXT90:    CLRA
   TESTB
   BP      ADDOFF
   CPLA
ADDOFF:    ADDD    TOFF        ;ADD THE BURST ERROR
                               ; CORRECTION
           STD     ZM0         ;SAVE POSITION ERROR
   SUBD    ZM1                 ;SUBTRACT PREVIOUS
                               ; POSITION ERROR
   SLAD                        ; *16
   SLAD
   SLAD
   SLAD
   EXDX
   BP      CHKVAL
;
   CMPX    #0FFC0H
   EXDX
   BH      SVVEL
```

```
        LDB       #0C0H
        BR        SVVEL
CHKVAL: CMPX      #40H
        EXDX
        BL        SVVEL
        LDB       #40H
SVVEL:  STB       TEMP7
;
        LDD       ZM0
        ADDD      ZM1
        ADDD      INTEGRAL
        STD       INTEGRAL
;*
        ADDA      TEMP7             ;VELOCITY + INTEGRAL
        STA       TEMP7             ;SAVE
;*
        LDD       ZM0               ;SCALE THE POSITION ERROR
        STD       ZM1
        ADDB      TEMP7             ;POSITION +
                                    ; VELOCITY + INTEGRAL
;*
; OUTPUT A NEW VALUE TO ONE OF THE DAC'S
;*
        XORB      #80H
        LDX       DETOUT            ;GET OUTPUT ROUTINE
                                    ; POINTER
        JMP       0,X
;*
DTOUT1: NEGB                        ;INVERT CURRENT DIRECTION
DTOUT2: ADDB      ZERO2             ;ADD    DAC2 CURRENT
                                    ;  OFFSET
        STB       DAC2
        LDX       TEMP9             ;DWELL TIMER
        DECX
        STX       TEMP9
        BNZ       DLP40
        RET
;*
```

```
DTOUT3:     NEGB                        ;INVERT CURRENT DITECTION
DTOUT4:     ADDB    ZERO1               ;ADD DAC1 CURRENT OFFSET
    STB     DAC1
    LDX     TEMP9               ;DWELL TIMER
    DECX
    STX     TEMP9
    BNZ     DLP40
    RET
;*
;***********************************************************
;
;A subroutine to measure and normalize SIN/COS to
; real SIN/COS
;Takes  Usec including call/ret
;We design for a max velocity of 1 ips
; (1000 lines/sec [Hz] at 1 trks/line)
;thus we adjust the differentiation so
;that d/dt sin(wt) =255 at 1000 lines/sec
;For each line we get a total value of approx 20H per
; 90degrees or 80H per line
;If we use 16 bits we can handle an adequate number
; of lines for settling
;read the sensors
GET.SIN.COS:
    LDB     PORT6       ;get the port6 mask
                        ;3
    ANDB    #SINE       ;mask to see the SINE sensor
                        ; first                 ;2
    STB     PORT6
                                                ;3
    LDA     ADC         ;read the ADC
                                ;7
    INCB                ;point to the cosine sensor
                        ;1
    STB     PORT6
                        ;3
    LDB     ADC
                                ;7
```

```
;Normalize the values
    STA     TEMP1       ;awhile
    LDA     COSINE.AMPL
    MUL
    SUBA    COSINE.ZERO
    LDB     TEMP1
    STA     TEMP2       ;awhile
    LDA     SINE.AMPL
    MUL
    SUBA    SINE.ZERO
    STA     TEMP1       ;for later use
    RET
;*
GET.SIN.COS2:               ;ROUTINE FOR USE
                            ; BEFORE CALIBRATION
    LDB     PORT6
    ANDB    #SINE
    STB     PORT6
    LDA     ADC
    INCB
    STB     PORT6
    LDB     ADC
    SUBA    #80H
    SUBB    #80H
    STD     TEMP1
    RET
;-------------------------------------------------------
;*
;           ROUTINE TO UPDATE THE LINE COUNT
;           ACCORDING TO THE QUADRANT #
;*
UPDATE.LINE:
    CALL    GET.SIN.COS
    LDX     LINE
    LDD     TEMP1           ;GET VALUES AGAIN
    TESTA
    BN      QUA4
;
```

```
QUA1:       TESTB
    BN      QUA11           ;IN 1ST QUADRANT ?
    OR      #1,FLAGS        ;SET #1 QUADRANT FLAG
    ANDTEST #2,FLAGS        ;COMING FROM 4TH QUADRANT?
    BZ      QUA11
    AND     #0FDH,FLAGS     ;RESET #4 QUADRANT FLAG
    INCX                    ;INCREMENT LINE COUNT
    STX     LINE
QUA11:      RET
;
QUA4:       TESTB
    BN      QUA44           ;IN 4TH QUADRANT
    OR      #2,FLAGS        ;SET    QUADRANT #4 FLAG
    ANDTEST #1,FLAGS        ;COMING FROM 1ST QUADRANT?
    BZ      QUA44
    AND     #0FEH,FLAGS     ;RESET QUADRANT #1 FLAG
    DECX                    ;DECREMENT LINE COUNT
    STX     LINE
QUA44:      RET
;*
;-------------------------------------------------
GET.COSINE.SIGNUM.CHANGE:
;Read the cosine detector and loop until we get the
; first signum change
    LDA     PORT6
    ANDA    #11111000B
    INCA                    ;point at cosine sensor
    STA     PORT6
    LDA     ADC     ;read the cosine sensor
    LDB     COSINE.AMPL ;scale, and subtarct the
                            ; zero to give us signum
    MUL
    SUBA    COSINE.ZERO
    BN      LOOP.FOR.POSITIVE
LOOP.FOR.NEGATIVE:          ;else...
    LDA     ADC     ;read the sine sensor
                    ;7
    LDB     COSINE.AMPL ;and subtarct the zero
```

```
                        ; to give us signum
    MUL
    SUBA    COSINE.ZERO
    BP      LOOP.FOR.NEGATIVE
                        ;3
    BR      NXT51
                        ;3
LOOP.FOR.POSITIVE
    LDA     ADC         ;read the sine sensor
                        ;7
    LDB     COSINE.AMPL ;and subtarct the zero
                        ; to give us signum
    MUL
    SUBA    COSINE.ZERO
    BN      LOOP.FOR.POSITIVE
                        ;3
NXT51:  RET
;*********************************************************
HIT.CRASH.STOP:
    LDX     #COMTBL     ;COMMUTATE TO CRASH STOP
    STX     COMSEQ
    CALL    INCOM
;
HIT1:   LDD     #0FFFFH
    STD     LINE
    CALL    INCOM
    LDX     LINE
    BP      HIT1        ;MOVING TOWARD CRASH STOP?
    CMPX    #-75
    BH      HIT1        ;MORE THAN 150
                        ; TRACKS MOVED?
;
; TEST IF AGAINST THE CRASH STOP BY COMMUTATING AND
; DETECTING LESS THAN 150 TRACKS OF MOVEMENT.
;
HIT2:   LDD     #0FFFFH
    STD     LINE        ;INITALIZE LINE COUNT
    CALL    INCOM
```

```
          LDX      LINE
          CMPX     #-75
          BL       HIT2              ;LESS THAN 150
                                     ; TRACKS MOVED ?
          RET
;
INCOM:    LDX      COMSEQ            ;ADJUST COMMUTATION
                                     ; POINT
     INCX
     BR       DEC1
DECOM:    LDX      COMSEQ
     DECX
DEC1:     STX      COMSEQ
     LDB      #0A0H
     CALL     OUTDAC           ;OUT TO DAC
     CALL     CNTTRK           ;COUNT ENCODER LINES
     RET
;
DECOM2:   LDX      COMSEQ            ;ADJUST
                                     ; COMMUTATION POINTER
     DECX
     STX      COMSEQ
     LDB      #0A0H
     CALL     OUTDAC           ;OUT TO DAC
     RET
;
OUTDAC:   LDX      COMSEQ            ;COMMUTATION POINTER
     LDA      #80H
     ANDTEST  #80H,0,X
     BZ       OUT1             ;SELECT CURRENT DIRECTION
     NEGB
OUT1:     ANDTEST  #1,0,X
     BZ       OUT2             ;SELECT DAC (80H TURNS
                               ; DAC OFF)
     ADDA     ZERO1            ;ADD DAC1 CURRENT OFFSET
     STA      DAC1
     ADDB     ZERO2            ;ADD DAC2 CURRENT OFFSET
     STB      DAC2
```

```
        RET
OUT2:   ADDA    ZERO2               ;ADD DAC2 CURRENT OFFSET
        STA     DAC2
        ADDB    ZERO1               ;ADD DAC1 CURRENT OFFSET
        STB     DAC1
        RET
;
CNTTRK: LDX     #20000              ;COUNT THE NUMBER OF
                                    ; LINES MOVED
CNTRK:  CALL    GET.SIN.COS2
        LDD     TEMP1
        TESTA
        BN      QUD3
;
QUD1:   TESTB
        BN      QUD2
        OR      #1,FLAGS            ;SET QUADRANT #1 FLAG
        ANDTEST #2,FLAGS            ;COMING FROM THE
                                    ; 4TH QUADRANT?
        BZ      TRKLP
        AND     #0FDH,FLAGS         ;RESET QUADRANT #4 FLAG
        EXDX
        LDX     LINE
        INCX                        ;INC LINE COUNT
        STX     LINE
        EXDX
        BR      TRKLP
;
QUD2:   AND     #0FCH,FLAGS         ;RESET QUADRANT FLAGS
        BR      TRKLP
;
QUD3:   TESTB
        BP      QUD4
        AND     #0FCH,FLAGS         ;RESET QUADRANT FLAGS
        BR      TRKLP
;
QUD4:   OR      #2,FLAGS            ;SET QUADRANT #4 FLAG
        ANDTEST #1,FLAGS            ;COMING FROM 1ST QUADRANT?
```

```
        BZ       TRKLP
        AND      #0FEH,FLAGS      ;RESET QUADRANT #1 FLAG
        EXDX
        LDX      LINE
        DECX                      ;DEC LINE COUNT
        STX      LINE
        EXDX
TRKLP:  DECX                      ;DEC LOOP COUNTER
        BNZ      CNTRK
        RET
;
;**********FIND THE MAGNETIC NULL POINT****************
;
FNDNUL: CALL     HIT.CRASH.STOP   ;COMMUTATE TO CRASH STOP
        LDD      #0
        STD      LINE             ;CLEAR LINE COUNT
FNDN1:  CALL     DECOM
        LDX      LINE
        CMPX     #100             ;MORE THAN 200 TRACKS
                                  ; FROM STOP?
        BL       FNDN1
;
        STX      TEMP3            ;SAVE MAGNETIC NULL #1
        CALL     DECOM
        CALL     INCOM
        RET
;
;***********ROUTINE TO UPDATE MOTOR COMMUTATION*********
;
; X= # OF TRACKS REMAINING
;
GETCOM: CMPX     #0
        BZ       NOCOM            ;NO UPDATE IF X=0
        EXDX
        LDX      COMSEQ
        ANDTEST  #20H,FLAGS
        BNZ      INCOM2           ;REVERSE MOVEMENT?
;
```

```
        CPLA
        CPLB
        ADDD    #1
        ADDD    COMCNT
        BC      GETSE           ;COMMUTATION POINT?
        ADDD    #300
        DECX                    ;ADJUST TABLE POINTER
        BR      GETSE
;
INCOM2: ADDD    COMCNT          ;ADJUST TRK COUNT
        EXDX
        CMPX    #300
        EXDX
        BL      GETSE           ;COMMUTATION POINT?
        ADDD    #-300
        INCX
;
GETSE:  STX     COMSEQ          ;GET MOTOR COMMUTATION
        STD     COMCNT          ;SAVE TRK COUNT
NOCOM:  RET
;
;*******   COMMUTATION SEQUENCE TABLE *******************
;
        DB      081H            ;MSB = CURRENT
                                ; DIRECTION SWITCH
        DB      080H            ;LSB = DAC SELECT
                                ; SWITCH
        DB      001H
        DB      000H
COMTBL: DB      081H
        DB      080H
        DB      001H
        DB      000H
        DB      081H
        DB      080H
        DB      001H
        DB      000H
;
```

```
;------------------------------------------------
COARSE.PROFILE.TABLE:   ;40 TO 107 TRACKS
; FROM DESTINATION ( 2 TRK/ENTRY)
;*
   DB      0,0,0,0,0,0,0,0,0,0
   DB      0,0,0,0,0,0,0,0,0,0
   DB      75,77,79,81,83,85,87,89,91,93
   DB      95,96,98,100,102,103,105,107,108,110
   DB      112,113,115,117,118,120,121,123,125,126
   DB      127,127,127,127
;*
FINE.PROFILE.TABLE:        ;4 TO 39 TRACKS FROM
; DESTINATION (1 TRK/ENTRY)
;*
   DB      14,14,14,14,16,18,20,21,23,25
   DB      26,28,30,31,33,35,36,38,40,41
   DB      43,45,46,48,50,51,53,55,56,58
   DB      60,61,63,65,66,68,70,71,73,73
;*
;------------------------------------------------
LOW.VELOCITY:     ;2 TRACKS FROM DESTINATION (64 UIN./ENTRY)
;*
   DB      6,6,6,8,10,11,11,11,12,12
   DB      12,13,13,13,14,14,14,15,15,15
   DB      16,16,16,17,17,17,18,18,18,19
   DB      19,19,20,20,20,21,21,21,22,22
   DB      22,23,23,23,24,24,24,25,25,25
   DB      25,25,25,25,25,25,25,25,25,25
;*
;------------------------------------------------
INVERSE.TABLE: ;A table relating period to velocity.
;One line (=2 trks) = 2mil, so 1ips=500 lines/sec,
; period=2msec, count=4000
;With a cntr divisor of 32 the input offset ranges
; from 11.57 to 125 for speeds
;  from  127 to 11.76 (relative to 127=10.8ips)
; Thus the inverse of X = (1/X) *1470
```

```
;*
   db       255,255,255,255,255,255,245,210,183,163
   db       147,133,122,113,105,98,91,86,81,77
   db       73,70,66,63,61,58,56,54,52,50
   db       49,47,45,44,43,42,40,39,38,37
   db       36,35,35,34,33,32,31,31,30,30
   db       29,28,28,27,27,26,26,25,25,24
   db       24,24,23,23,22
;-----------------------------------------
; The lookup TABLEs
; We have a 16 Uinch resolution (with 16 bit arithmetic)
; The table translates between a voltage
; from 0 to 1 volt and a distance from 0 to 1000 Uinch
;The number of table entries is fixed by the
; size of the encoder outputs.
; The maximum p-p output would be
; 255 (giving 127 for the base-peak)
; Our table must be large enough so that we can
; quickly scale the actual
; encoder output to give us a vlue for
; the lookup table.
; If we use a binary fraction then we get a
; reduction in our
;  arithmetic resoultion, as we reduce the size of the
; numbers we are
;  dealing with.
;We have decided to accept this penalty and go for
; a table of 64 entries
;Using the HP-41C as the table generator we
; got (from x=arcsin(v) * 320/90)
; Since the lookup range is 0 to 63 we use 64
; table entries
;*
FINE.TABLE:          ; INT( 128 * ( ARCSIN(1/64)/90 ) )
;
   DB       0,1,3,4,6,8,9,11,12,14
   DB       15,17,18,20,22,23,25,26,28,29
   DB       31,33,34,36,37,39,41,42,44,45
```

```
        DB      47,49,50,52,53,55,57,58,60,62
        DB      63,65,67,69,71,73,75,77,79,81
        DB      83,85,87,89,91,94,96,98,101,104
        DB      107,111,115,121,127,127,127,127,127,127
        DB      127,127,127,127,127,127,127,127,127,127
;*
;**********************************************************
;
;DIVIDE:  ;24 Bit by 24 Bit Integer Division
;
;destroys ACCA
;                    (DIVIDEND,+1,+2)
; DIVIDEND,+1,+2  =--------------------- + REM,+1,+2
;                    (DIVISOR,+1,+2)
; The dividend & divisor are stored in memory with
;    the MSByte first
;
;COUNTER:   DS    1        ;A scratch location for loop count
;RESULT:    EQU   $        ;Result replaces dividend
;DIVIDEND:  DS    3        ;destroyed
;DIVISOR:   DS    3        ;kept intact
;REM:       DS    3        ;returns with remainder
;
; The divisor is successively subtracted from the high
;    order bits of the dividend. After each subtraction
;    the result is used instead of the initial dividend
; The result is increased by 1 each time.
; When the result of the subtraction is negative the
;    partial result is restored by adding the divisor
;    back to it.
; The result is simultaneously decremented by 1
;
;First check if divisor is 0
DIVIDE:    LDA    DIVISOR
   XORA    DIVISOR+1
   BNZ     DIV.NXT1
   XORA    DIVISOR+2
   BZ      DIVBY0
```

```
;clear result
DIV.NXT1: CLRA
    STA     REM
    STA     REM+1
    STA     REM+2
;loop counter
    LDA     #24
    STA     COUNTER
;
;Rotate Dividend left
    CLRC
ZZDIV1:  RLC     DIVIDEND+2
    RLC     DIVIDEND+1
    RLC     DIVIDEND
;Rotate Remainder left and collect carry result
    RLC     REM+2
    RLC     REM+1
    RLC     REM
    LDA     REM+2
    SUBA    DIVISOR+2
    STA     REM+2    ;Modify to reflect result
    LDA     REM+1
    SBCA    DIVISOR+1
    STA     REM+1    ;Modify to reflect result
    LDA     REM
    SBCA    DIVISOR
    STA     REM      ;         "
    BNC     ZZPOS
;otherwise negative
    LDA     REM+2    ;Restore dividend
    ADDA    DIVISOR+2
    STA     REM+2
    LDA     REM+1    ;Restore dividend
    ADCA    DIVISOR+1
    STA     REM+1
    LDA     REM
    ADCA    DIVISOR
    STA     REM
```

```
ZZPOS:    BNC     ZZPOS1  ;If carry is clear set it
   CLRC           ;if set, clear it
   BR      ZZPOS2  ;Thus complement the carry
ZZPOS1:   SETC
ZZPOS2:   DEC     COUNTER
   BNZ     ZZDIV1
   RLC     DIVIDEND+2  ;Shift in last result bit
   RLC     DIVIDEND+1
   RLC     DIVIDEND
   RET             ; ***** DONE ****
;
DIVBY0    LDA     $0FFH   ;infinity
   STA     DIVIDEND+2
   STA     DIVIDEND+1
   STA     DIVIDEND
; Output a diagnostic message if desired
   RET
;----------------------------------------------------
; CONVERT:
; Converts a 16 bit dividend and a 16 bit divisor to
; an 8 bit binary fraction
; sourced 8/22/83 by Trevor Marshall,
;    Cambrian Consultants
; On entry:
;          The divisor is in memory,
;                   double precision, at DIVISOR
;          The dividend is in memory,
;                   double precision, at DIVIDEND
; When done the result is stored in FRACTION
;          the divisor is not destroyed
;                   provided TEMP ram is available
; X is untouched, Uses TEMP1, TEMP2, TEMP3
;
; time taken is  14 + (31*8) + 11 = 273 (136.5 Usec)
; average
; There is no time disdvantage in handling 16 bit
;   input values as the
;   multiplication by 2 must be performed in double
```

```
;      precision unless
;      the denominator is forced to be <= 128
;      See CONV7 for 7bit ( 2's complement magnitude) values
;
;DIVISOR:   DW      45        ;answer is 3FH from these values
;DIVIDEND:  DW      182
;FRACTION:  DS      1
;COUNTER:   DS      1         ;a loop counter
;                             ; in scratch ram
;TEMP:      DS      2         ;temp variable storage
;
CONVERT:
    LDA     #8                ;initialize loop count
                              ;2
    STA     COUNTER
                              ;3
    CLR     FRACTION
                              ;5
    LDD     DIVISOR  ;get divisor to AB (double)
                              ;4
FRACLOOP:
    SLAD                      ;multiply it by 2
                              ;1
    STD     TEMP2    ;save it temporarily
                              ;4
    SUBD    DIVIDEND ;subtract the dividend
                              ;4
    BNC     TERMINATE ;if No Carry then AB is
                      ; larger than DIVIDEND    ;3
    LDD     TEMP2    ;retrieve the previous
                     ; value of AB              ;4
TERMINATE:
    RLC     FRACTION
                              ;6
    DEC     COUNTER
                              ;6
    BNE     FRACLOOP
                              ;3
```

```
    COM      FRACTION     ;the carry flags have
                          ; to be inverted
                          ;6
    RET                   ;done
                          ;5
;***********************************************************
;
BEGIN:
    DI
    LDA      #0D8H              ;SET TRK 0
    STA      PORT8
    LDA      #098H              ; SET SEEK COMP AND
                                ;    CPU NOT READY
    STA      PORT8
    STA      PORT8I
    AND      #0EFH,PORT6        ;TURN OFF GREEN
                                ;  LED IF ON
;
;
    AND      #0FCH,FLAGS        ;RESET FLAGS
    CLRA
    CLRB
    STD      LINE
;
    CALL     FNDNUL
    LDD      LINE               ;GET MAGNETIC NULL #2
    SUBD     TEMP3              ;SUBTRACT MAGNETIC NULL #1
    SRAA
    RRCB                        ;AVERAGE THE 2 NULL POINTS
    ADDD     #150               ;INITIALIZE THE
                                ; COMMUTATION COUNTER
    STD      COMCNT
    EXDX
    LDX      COMSEQ
    INCX
    STX      COMSEQ
;
```

```
        LDB     #03H
        STB     T2CON   ;RESET TIMER 2
        LDA     #0FFH
        STA     T2CMP   ;LOAD COMPARE REGISTER
        CLRA
        STA     TIMER2  ;CLEAR THE COUNTER
        LDB     #T2RST
        STB     T2CON   ;ENABLE COUNTER
        STA     COUNT1
READY:
        LDD     #08     ;LOOK FOR TRACK -2
        STD     TRKNUM
        BR      CA8
CA2:    LDX     TRKNUM
        INCX
        STX     TRKNUM
        CMPX    #30
        BN      CA8
        LDA     COUNT1
        INCA
        CMPA    #3
        BZ      ERROR11
        STA     COUNT1
        BR      READY
ERROR11:
        LDA     #5
        STA     TEMP1
        JMP     FLASH
CA8:    CALL    DATRK   ;MOVE TO TRACK REQUESTED
        LDA     PORT8I  ;SELECT PROPER HEAD , HD0
        ANDA    #0F8H
        STA     PORT8I
        STA     PORT8
        LDX     #BRSTCK ;SET UP VECTOR INTERRUPT
        STX     IRQ2+1
        CLRA
        STA     FLAG    ;CLEAR THE INT. FLAG
        CALL    CLRINT
```

```
CA1:    CALL    DETENT
        LDA     FLAG
        BZ      CA1
        DI
        ANDA    #080H           ;CHECK IF A>B
        BNZ     CA4
        CALL    RESYNC          ;IF NOT, RESYNC AND
                                ;  TRY AGAIN
        LDX     #BRSTCK
        STX     IRQ2+1          ;SET UP VECTOR
                                ;   INTERRUPT
        CLRA
        STA     FLAG
        CALL    CLRINT
CA3:    CALL    DETENT
        LDA     FLAG
        BZ      CA3
        DI
        ANDA    #080H
        BNZ     CA4
        BR      CA2
CA4:    INC     TRKNUM+1
        CALL    DATRK   ;MOVE TO TRK -1
        LDA     PORT8I  ;SELECT PROPER HEAD, HD 1
        INCA
        STA     PORT8I
        STA     PORT8
CA7:    CLRA
        STA     FLAG
        CALL    CLRINT
CA5:    CALL    DETENT
        LDA     FLAG
        BZ      CA5
        DI
        ANDA    #080H   ;CHECK IF BURST WAS PRESENT
        BZ      READY
CA6:    INC     TRKNUM+1
        CALL    DATRK   ;MOVE TO TRACK REQUESTED
```

```
        LDD     TRKNUM
        STD     LINOFF      ;FIND TRACK OFFSET
        LDD     #0
        STD     TRKNUM
        STA     FLAG        ;CLR SPINDLE SPEED ERROR FLAG
        LDA     #0D8H
        STA     PORT8       ;SET SEEK COMPLETE
        LDA     #098H
        STA     PORT8I      ;SET TRK 0
        STA     PORT8
        LDX     #INDEX
        STX     IRQ2+1
        TEST    REVCNT
        BNZ     CA10
        CALL    CLRINT
CA9:    CALL    DETENT      ;WAIT 75 REV'S FOR
                            ; SERVO BURST CORRECTION
        LDA     REVCNT
        CMPA    #75
        BN      CA9
CA10:   CALL    CLRINT
        OR      #10H,PORT6  ;TURN ON GREEN LED
        LDA     PORT8I      ;SET CPU READY
        ANDA    #0EFH
        STA     PORT8I
        STA     PORT8
        CLRA
        STA     TIMER2
        LDA     #T2RST
        STA     T2CON
        JMP     READY1
;*******************************************
;    INTERRUPT ROUTINES                    *
;*******************************************
INDEX:  LDB     PORT6       ;READ A AND B BURST ON INTERRUPT
        PUSHB               ;SAVE FOR LATER
        LDB     #02H
        STB     PORT6       ;RESET INTEGRATOR AND
```

```
                        ; SETUP MUX
    LDD     TIMER       ;READ TIMER FOR SPINDLE
                        ; SPEED CHECK
    STD     SPNTIME1    ;SAVE TIMER VALUE
                        ; FOR NEXT REV.
    SUBD    SPNTIME0    ;FIND ACTUAL REV.
                        ; TIME OF SPINDLE
    EXDX                ;STORE IN "X"
    INC     REVCNT
    NOP
    NOP
    LDB     #04
IND1: DECB              ;WASTE TIME
    BNZ     IND1
    LDA     #022H
    STA     PORT6
    LDB     #07
IND2: DECB
    BNZ     IND2
    LDA     ADC         ;READ A BURST
    LDB     #02H        ;RESET INTEGRATOR
    STB     PORT6
    CMPX    #34405      ;CHECK SPINDLE SPEED
    BP      ERR1
    CMPX    #31128
    BN      ERR2
    ORB     38H
    ORB     38H         ;WASTE TIME
    CLRB
    STB     FLAG
    BR      IND17
ERR1: ORB   38H
    ORB     38H         ;WASTE TIME
ERR2: LDB   FLAG
    INCB
    CMPB    #05
    BN      IND16
    JMP     ERROR6
```

```
IND16:    STB     FLAG
IND17:    LDX     SPNTIME1
          STX     SPNTIME0
          LDB     #03
IND3:     DECB                    ;WASTE TIME
          BNZ     IND3
          LDB     #022H
          STB     PORT6
          LDB     #07
IND4:     DECB
          BNZ     IND4
          LDB     ADC             ;READ THE B BURST
          SUBAB
          POPB
          STB     PORT6           ;RETURN PORT6 TO ORG STATE
          LDX     TOFF
          TESTA
          BZ      NOCHNG
          BP      PCHNG
          CMPX    #-80            ;MAX CORRECTION
                                  ; 320 UINCHES
          BN      NOCHNG1
          DECX
          BR      IND5
PCHNG:    CMPX    #80             ;MAX CORRECTION
                                  ; 320 UINCHES
          BP      NOCHNG1
          INCX
          BR      IND5
NOCHNG:   MUL                     ;WASTE TIME
          NOP
          NOP
NOCHNG1:
          ANDA    038H            ;WASTE TIME
          NOP
          BR      IND6
IND5:     STX     TOFF
IND6:
```

```
        LDA     PORT9I
        ANDA    #10111111B      ;RESET THE INTERRUPT
        STA     PORT9
        ORA     #01000000B
        STA     PORT9
        LDA     PORT8I
        ANDA    #11110111B      ;GENERATE THE INDEX
        STA     PORT8
        NOP
        ORA     #00001000B
        STA     PORT8
        RETI
;
ERROR6: LDA     #6              ;SPINDLE SPEED ERROR
        STA     TEMP1
        JMP     FLASH
;
;
SYNC:   LDA     PORT9I  ;RESYNC INDEX FLIP FLOP
        ANDA    #09FH
        STA     PORT9
        ORA     #040H   ;CLEAR INTERRUPT LATCH
        STA     PORT9
        ORA     #020H
        STA     PORT9
        LDA     #0FFH
        STA     FLAG
        RETI
;
BRSTCK: LDB     PORT6
        PUSHB
        LDB     #02H
        STB     PORT6   ;RESET BURST INTEGRATOR
        LDB     #10
BV1:    DECB
        BNZ     BV1
        LDA     #022H
        STA     PORT6
```

```
        LDB     #07
BV2:    DECB
   BNZ     BV2
   LDA     ADC
   LDB     #02H
   STB     PORT6
   LDB     #11
BV6:    DECB
   BNZ     BV6
   LDB     #022H
   STB     PORT6
   LDB     #7
BV7:    DECB
   BNZ     BV7
   LDB     ADC
   SUBAB
   POPB
   STB     PORT6
   TESTA
   BP      BV3
   CMPA    #0E0H
   BP      BV3
   LDA     #081H     ;BURST WAS PRESENT AT INDEX
   STA     FLAG
   BR      BV4
BV3:   LDA     #01       ;BURST WAS NOT PRESENT AT INDEX
   STA     FLAG
BV4:   LDA     PORT9I    ;RESET INTERRUPT LATCH
   ANDA    #10111111B
   STA     PORT9
   ORA     #01000000B
   STA     PORT9
   RETI
;
PWRFLT:
   LDA     #04
   STA     TEMP1
   JMP     FLASH
```

```
;
SPNCK:      LDD     TIMER
   STD      SPNTIME1
   SUBD     SPNTIME0
   EXDX
   CMPX     #36125
   BP       NOGO
   LDA      #081H
   STA      FLAG
   BR       OKA
NOGO:       LDA     #01
   STA      FLAG
   LDX      TEMP1
   INCX
   CMPX     #600
   BN       OKB
   JMP      SPNERR
OKB:        STX     TEMP1
OKA:        LDA     #0BFH
   STA      PORT9
   ORA      #40H            ;RESET INTERRUPT LATCH
   STA      PORT9
   LDX      SPNTIME1
   STX      SPNTIME0
   RETI
;***************************************************
;
READY1:     CALL    DETENT
            LDA     PORT8           ;CHECK IF SELECTED
   ANDA     #10H
   BNZ      READY2
            AND     #0F7H,PORT6     ;TURN OFF RED LED
   BR       READY3
READY2:     OR      #08H,PORT6      ;TURN ON RED LED
READY3:     TEST    TIMER2          ;CHECK IF ANY STEP PULSES
   BZ       READY1
   LDA      PORT8                   ;CHECK DIRECTION
   ANDA     #04H
```

```
        STA     DIR
        LDA     PORT8I          ;RESET TRK0 I/O LINE
        ORA     #20H
        STA     PORT8I
        STA     PORT8
        LDD     #0              ;CLEAR SOFTWARE
                                ; STEP COUNTER
        STD     COUNT1
;
RD3:    CALL    DETENT
        ANDTEST #80H,T2CON      ;CHECK IF COUNTER IS FULL
        BZ      RD4
        LDD     COUNT1
        ADDD    #100H
        STD     COUNT1
        LDA     #T2RST
        STA     T2CON           ;CLEAR COMPARE FLAG
;
RD4:    ANDTEST #08H,PORT8      ; CHECK IF LAST
                                ; STEP PULSE IS IN
        BZ      RD3
        ANDTEST #80H,T2CON      ;CHECK IF COUNTER
                                ; IS FULL AGAIN
        BZ      RD5
        LDD     COUNT1
        ADDD    #100H
        STD     COUNT1
        LDA     #T2RST
        STA     T2CON
;
RD5:    CLRA
        LDB     TIMER2
        STA     TIMER2
        ADDD    COUNT1
        STD     COUNT1
;
        TEST    DIR
        BZ      OUT             ;REVERSE DIRECTION
```

```
;
IN:       LDD       COUNT1
   ADDD   TRKNUM
   EXDX
   CMPX   #612                ;COMPARE WITH MAX
                              ; TRACK NUMBER
   BP     ERROR2
   STX    TRKNUM
   JMP    RDOK
;
OUT:      LDD       TRKNUM
   SUBD   COUNT1
   EXDX
   CMPX   #0                  ;COMPARE WITH MIN
                              ; TRACK NUMBER
   BN     ERROR3
   STX    TRKNUM
   BR     RDOK
;
;
ERROR2:   LDX       TRKNUM
   CMPX   #612
   BZ     RDOK1               ;DON'T SEEK IF
                              ; AT TRK 612
   LDX    #612
   STX    TRKNUM
   BR     RDOK
;
ERROR3:   JMP       BEGIN
;
RDOK:
   LDD    TRKNUM
   ADDD   LINOFF
   STD    DESTINATION
   CALL   SEEK
RDOK1:
   TEST   TIMER2              ;CHECK FOR ANY MORE
                              ; STEP PULSES
```

```
        BZ      RDOK2
        JMP     RD3
;
RDOK2:  LDA     PORT8I              ;SELECT PROPER HEAD
                                    ; TO READ BURST
        ANDA    #0F8H
        LDB     TRKNUM+1
        ANDB    #01
        BZ      SELEND
        ORA     #01
SELEND: STA     PORT8I
        STA     PORT8
        LDX     TRKNUM              ;SELECT PROPER
                                    ;  WRITE CURRENT
        CMPX    #300
        BP      LOCUR
        OR      #40H,PORT6          ;SET HI WRT CURRENT
        BR      RDOK4
LOCUR:  AND     #0BFH,PORT6         ;RESET HI WRT CURRENT
;
RDOK4:  CMPX    #0                  ;CHECK IF AT TRACK 0
        BNZ     RDOK3
        LDA     PORT8I              ;IF SO SET
                                    ;  TRK 0 I/O LINE
        ANDA    #0DFH
        STA     PORT8I
        STA     PORT8
;
RDOK3:
        CALL    CLRINT              ;ENABLE THE INTERRUPT
        LDA     PORT8I              ;SET SEEK COMPLETE
        ORA     #40H
        STA     PORT8
        LDA     PORT8I
        STA     PORT8
        JMP     READY1
;
DATRK:  LDD     TRKNUM              ;MOVE TO TRACK REQUESTED
```

```
        STD     DESTINATION
        CALL    SEEK
        RET
;
CLRINT: LDA     PORT9I          ;CLEAR THE INTERRUPT LATCH
        ANDA    #0BFH
        STA     PORT9
        ORA     #040H
        STA     PORT9
        EI
        RET
;
RESYNC: LDX     #SYNC
        STX     INTRPT2
        CLRA
        STA     FLAG
        CALL    CLRINT
RS1:    CALL    DETENT
        TEST    FLAG
        BZ      RS1
        DI
        RET
;
FLASH:  LDA     #80H
        STA     DAC1            ;FLASHES RED LED TO
                                ; DISPLAY ERROR CODE
        STA     DAC2
        AND     #0EFH,PORT6     ;TURN OFF GRN LED
        LDA     PORT8I
        ORA     #010H           ;RESET "CPU READY"
        STA     PORT8
        STA     PORT8I
FL20:   LDA     TEMP1           ;TEMP1 = NUMBER OF
                                ; TIMES TO FLASH
FL3:    OR      #08H,PORT6      ;TURN ON RED LED
        LDB     #02
FL7:    LDX     #0
FL1:    DECX
```

```
        BNZ     FL1
        DECB
        BNZ     FL7
        AND     #0F7H,PORT6     ;TURN OFF RED LED
        LDB     #02
FL2:    LDX     #0
FL6:    DECX
        BNZ     FL6
        DECB
        BNZ     FL2
        DECA
        BNZ     FL3
        LDB     #18H            ;4 SEC DELAY
FL5:    LDX     #0
FL4:    DECX
        BNZ     FL4
        DECB
        BNZ     FL5
        BR      FL20
;
;
        ORG     0FFE8H
        RETI
        ORG     0FFEAH
        DW      IRQ2
        DW      0FFE8H
        DW      0FFE8H
        DW      0FFE8H
        DW      0FFE8H
        DW      0FFE8H
        DW      0FFE8H
        DW      PWRFLT
        DW      0F000H
        DW      0F000H
        DW      0F000H           ;RESET
;
END:
;------------------------------------------------
==================================================
```

TABLE 1

It is consequently observed from the foregoing that an improved method and apparatus has been described which provides a number of significant advances in the art. In particular, increased range of motion of a transducer apparatus is achieved through the commutation of a prime mover associated with the transducing apparatus. In addition thereto, an improved method of control has been disclosed employing digital techniques. While the foregoing has been described in terms of a particular preferred embodiment, it should be understood that such description is not to be interpreted in a limiting manner. To the contrary, the present invention is only to be limited by the scope of the following claims.

I claim:

1. A disk drive head positioning system, comprising:
   an externally commutated D.C. motor;
   a carriage disposed to couple the motor to the head;
   a position transducer disposed to sense and indicate an actual position of the motor; and
   a control system receiving externally generated position commands and actual position indications from the position transducer, the control system energizing the motor to position the head at commanded positions while commutating the motor in response to the position indications so as to avoid commutating the motor at a destination position.

2. A method, responsive to external position commands, for positioning a transducing apparatus relative to a rotating storage medium at a selected position thereon by controlling energization of an externally commutated brushless D.C. motor connected to position the transducer, comprising the steps of:
   determining a plurality of successive current positions of the transducing apparatus with respect to the rotating storage medium as the transducing apparatus moves toward the selected position;
   externally commutating the brushless D.C. motor in response to the determined positions as the transducing apparatus moves toward the selected position with the positions of the transducing apparatus at which the commutations occur being selected to suppress commutation at the selected position; and
   producing displacement of the transducing apparatus in discrete ranges of displacement from the selected position by separately exciting the motor with a different mode of excitation in each different range of displacement from the selected position.

3. Apparatus, responsive to external position commands, for positioning a transducing apparatus relative to a rotating storage medium at a selected position thereon commanded by an external position command, comprising:
   an externally commutated D.C. motor producing displacement of the transducing apparatus in response to displacement of the motor;
   coupling means for coupling the motor to the transducing apparatus;
   position sensing means coupled to said motor for sensing a position of the motor with respect to the rotating storage medium; and
   control means, responsive to said position sensing means and the external position commands for controlling motion of the transducing apparatus to the selected position by providing commutation commands to the motor in response to position information from the position sensing means, the commutation commands being given to the motor at positions of the motor relative to the storage medium which are selected to suppress commutation at the commanded selected position.

4. Apparatus as recited in claim 3, wherein said motion means is a linear voice coil motor.

5. Apparatus as recited in claim 3, wherein the motor has a plurality of different, separately excitable discrete ranges of displacement, wherein the position sensing means senses a position of the motor with respect to the discrete ranges of displacement, and wherein said control means further comprises:
   difference means responsive to a position sensed by said position sensing means and the selected position for determining the difference therebetween;
   time means for providing time information;
   position control means responsive to said difference means and to said time means and coupled to said motion means for determining which one of the different discrete ranges of displacement the motor is in at any given time; and
   means for exciting the motor differently for each of the plurality of different discrete ranges of displacement.

6. Apparatus as recited in claim 5, wherein the control means is operable in a plurality of different modes of operation, each corresponding to a different range difference between a current transducer position and the selected position, the modes of operation including a high speed mode responsive to the difference being greater than a preselected distance for commanding displacement of the transducing apparatus at a constant preselected velocity.

7. Apparatus as recited in claim 5, further including means for storing a table of values which represent preselected velocities and wherein the control means is operable to excite the motor to produce displacement of the transducing apparatus at each of a plurality of differing velocities in response to the values stored in the table, the table being repetitively accessed as the transducer moves toward the selected position to select velocities for controlling motor excitation in response to the difference.

8. Apparatus as recited in claim 5, wherein:
   in a given range of displacement wherein the difference is less than a preselected distance the control means continually controls displacement of the transducing apparatus toward the selected position in response to a position error, a velocity error, and an integral of position error.

9. Apparatus according to claim 3, wherein said motor is a rotary voice coil motor.

10. Apparatus, responsive to external position commands, for positioning a transducing apparatus relative to a rotating storage medium at a selected position thereon as commanded by an external position command, comprising:
    motion means for producing displacement of the transducing apparatus in each of a plurality of discrete ranges of displacement from the selected position, the motion means being differently excitable in each discrete range of displacement;

coupling means for coupling the motion means to the transducing apparatus;

position sensing means responsive to an indication of one of the ranges of displacement from the selected position and coupled to said motion means for determining a position of the transducing apparatus with respect to the rotating storage medium, the spatial frequency with which the position of the motion means is determined being different for different indicated ranges of displacement; and control means, including difference means responsive to said position sensing means and to the selected position commanded by the external position commands for determining the difference therebetween, time means for providing time information, position control means responsive to the difference and to the time information for indicating each different range of displacement as the transducer is displaced relative to the storage medium and means for positioning the transducing apparatus at commanded positions relative to the rotating storage medium by exciting said motion means differently for each different one of the plurality of discrete ranges of displacement.

11. A method for moving a transducing apparatus from a first position to a desired second position with respect to a rotating storage medium by a positioning apparatus having an externally commutated motor and a plurality of separately excitable modes of motion, the rotating storage medium having a plurality of tracks for the storage of information:

determining by operation of the positioning apparatus each time the positioning apparatus is turned on, parameters associated with the positioning apparatus;

determining a plurality of successive current distances, each being a distance between a last determined current position of the transducing apparatus and the desired position, as the transducing apparatus moves toward the desired position;

determining a plurality of successive current velocities of the transducing apparatus as the transducing apparatus moves toward the desired position;

selecting a plurality of successive modes of motion for the transducing apparatus as the transducing apparatus moves toward the desired position, the successive modes of motion including at least two different modes of motion and being determined in response to a last determined distance and a last determined velocity; and energizing the positioning apparatus in response to each successive mode of motion and the determined parameters to advance the transducing apparatus toward the desired position while commutating the externally commutated motor within the positioning apparatus so as to avoid commutating the motor at the desired position.

12. A method for moving a transducing apparatus from a first position to a desired second position with respect to a rotating storage medium by positioning apparatus having a plurality of separately excitable ranges of motion, the rotating storage medium having a plurality of tracks for the storage of information, each track containing track centerline information, comprising the steps of:

determining parameters associated with the positioning apparatus;

repetitively determining a current position of the transducing apparatus with respect to the rotating storage medium with a spatial frequency which increases with decreasing distance to the desired destination;

repetitively determining a distance between the last determined current position of the transducing apparatus and the desired position;

repetitively determining a current velocity of the transducing apparatus;

repetitively selecting as a current mode of motion one of a plurality of different modes of motion for the transducing apparatus in response to a last determined current distance and current velocity; and advancing the transducing apparatus toward the desired position according to the selected current mode of motion and the determined parameters.

13. A method according to claim 11 or claim 12, wherein the step of selecting successive modes of motion includes the step of determining each mode of motion in response to a most recently determined current distance and a most recently determined current velocity.

14. A method according to claim 11 or claim 12 wherein the positioning apparatus includes an externally commutated brushless D.C. motor having a plurality of windings and further comprising the step of commutating the D.C. motor by energizing the windings in response to each most recently determined current position to produce a plurality of different energizations of the windings as the transducer moves toward the desired position.

15. A method according to claim 11 or claim 12, wherein the step of selecting a plurality of successive modes of motion includes selecting a high speed mode wherein the positioning apparatus is energized to maintain the velocity of the transducing apparatus at a preselected constant velocity while the most recently determined distance is greater than a first preselected distance, and selecting a non-high speed mode wherein the positioning apparatus is energized to decrease the velocity of the transducer in discrete steps when the most recently determined distance is equal to or less than the first preselected distance.

16. A method for moving a transducing apparatus according to claim 11 or claim 12, wherein the plurality of modes of motion include a medium speed mode wherein the positioning apparatus is energized to decrease the velocity of the transducing apparatus in discrete steps when a last determined velocity is less than a preselected velocity and when a last determined distance is greater than a second preselected distance.

17. A method for moving a transducing apparatus according to claim 16, wherein the plurality of modes of motion include a transition mode that is operative when a last determined distance is less than a third preselected distance and wherein the step of determining a plurality of successive current positions further comprises the step of:

determining during operation in the transition mode, a current position of the transducing apparatus as each successive track is crossed while the transducing apparatus moves toward the desired position.

18. A method for moving a transducing apparatus according to claim 11 or claim 12, wherein the plurality of modes of motion include a transition mode wherein the positioning apparatus is energized to decrease the velocity of the transducing apparatus in discrete steps while a last current determined distance is less than a first preselected distance and greater than a second preselected distance that is less than the first preselected distance.

19. A method for moving a transducing apparatus according to claim 18, wherein the step of determining a plurality of successive current positions further comprises the step of:
    determining a current position of the transducing apparatus as each successive track is crossed while the transducing apparatus moves toward the desired position.

20. A method for moving a transducing apparatus according to claim 11 or claim 12, wherein the plurality of modes of motion include a detent mode wherein the positioning apparatus is energized to position the transducing apparatus in response to a most recently determined current velocity, a most recently determined current position and an integral of a difference between each successive current position and a calculated desired current position while a most recently determined current distance is less than a preselected distance.

21. A method for moving a transducing apparatus according to claim 20, wherein the step of determining a plurality of successive current positions further comprises the step of:
    determining current position of the transducing apparatus while operating in the detent mode from track centerline information prerecorded on the storage medium as each successive track centerline is crossed while the transducer moves toward the desired position.

22. A method according to claim 11 or claim 12, wherein the step of selecting successive modes of motion includes the step of determining each mode of motion in response to a most recently determined current distance.

23. A method according to claim 11 or claim 12, wherein the step of selecting successive modes of motion includes the step of determining each mode of motion in response to a most recently determined current velocity.

24.
A method for moving a transducing apparatus from a first position to a desired second position with respect to a rotating storage medium by positioning apparatus having a plurality of different, separately excitable modes of motion, the rotating storage medium having a plurality of tracks for the storage of information, each track containing track centerline information, comprising the steps of:
    determining parameters associated with the positioning apparatus;
    determining a position of the transducing apparatus;
    determining as every other track is crossed a distance between a current position of the transducing apparatus and the desired position;
    determining a velocity of the transducing apparatus;
    selecting one of the plurality of different modes of motion for the transducing apparatus in response to the determined distance and velocity, the plurality of different modes including a high speed mode wherein velocity of the transducing apparatus is commanded to be maintained at a preselected constant velocity for a determined distance greater than a first preselected distance, and commanded to decrease in discrete steps for a determined distance equal to or less than the first preselected distance; and
    advancing the transducing apparatus toward the desired position according to the selected mode of motion and the determined parameters.

25. A method for moving a transducing apparatus from a current position to a desired position with respect to a rotating storage medium having a plurality of tracks for storage of information thereon, each track containing track centerline information, by monitoring position information of the transducing apparatus produced by position encoding apparatus, comprising the steps of:
    determining a distance between the current position of the transducing apparatus and the desired position from position information from the position encoding apparatus;
    determining a velocity of the transducing apparatus;
    selecting one of a plurality of modes of motion for the transducing apparatus responsive to the determined distance and velocity, the modes of motion including a first mode wherein said transducing apparatus is first accelerated to a selected velocity and thereafter maintained at substantially the selected velocity for a determined distance greater than a first preselected distance, and in response to determined distances equal to or less than the first preselected distance, or a determined velocity greater than a preselected velocity, decreasing the velocity in discrete steps, and wherein position of the transducing apparatus is determined with respect to every other track; a second mode wherein the velocity of said transducing apparatus is decreased in discrete steps for a determined velocity less than the preselected velocity and a determined distance greater than a second preselected distance, and wherein position of the transducing apparatus is determined with respect to every track; a third mode wherein velocity of said transducing apparatus is decreased in discrete steps for distances equal to or less than the second preselected distance and greater than a third preselected distance; a fourth mode responsive to the determined distance being less than the third preselected distance wherein position of the transducing apparatus is controlled in response to integration and differentiation of position information, as well as position information;
    advancing the transducing apparatus toward the desired position according to the selected mode of motion; and
    changing the selected mode of motion based upon distance and velocity measurements of the transducing apparatus associated with each of the modes of motion.

26. Apparatus responsive to external position commands, for positioning a transducing apparatus relative to a rotating storage medium at selected positions thereon, including encoding apparatus for producing values representative of position information of transducer positioning apparatus relative to the rotating storage media, by externally commutated transducer positioning apparatus having analog offset currents and commutation points associated therewith, comprising:
    a first means for determining the commutation points for the externally commutated transducer positioning apparatus;

a second means for determining the analog offset currents associated with the transducing positioning apparatus;

a third means for determining maximum and minimum of values produced by the position encoding apparatus;

a fourth means for determining position information of the transducing apparatus with respect to a selected position on the rotating storage medium; and control means, responsive to the encoding apparatus, the external position commands, and said first, second, third and fourth means for positioning the transducing apparatus at selected positions relative to the rotating storage medium by selectively commutating the transducer positioning apparatus.

27. Apparatus as recited in claim 26, wherein said control means further comprises:

difference means responsive to said encoding apparatus and the selected positions for determining the difference therebetween;

time means for providing continuous time information;

position control means responsive to said difference means and to said time means and coupled to said transducer apparatus for producing displacement of the transducing apparatus in a plurality of modes responsive to the difference.

28. Apparatus as recited in claim 27, further comprising:

means for determining position as a function of the mode so that frequency with which position is determined changes with the mode.

29. Apparatus as recited in claim 27, wherein the modes further comprise:

a first mode responsive to the difference being greater than a preselected distance for producing displacement of the transducing apparatus at a constant preselected velocity.

30. Apparatus as recited in claim 27, wherein the modes further comprises:

a plurality of modes responsive to the difference being less than a preselected distance for producing displacement of the transducing apparatus at a plurality of differing velocities according to a table of preselected velocities according to the difference.

31. Apparatus as recited in claim 27, wherein the modes further comprise:

a second mode responsive to the difference being less than a preselected distance for producing continuously controlled displacement of the transducing apparatus at selected positions according to a position error, a velocity error, and an integral of position error.

* * * * *

UNITED STATES PATENT AND TRADEMARK OFFICE
CERTIFICATE OF CORRECTION

PATENT NO. : 4,751,441

DATED : June 14, 1988

INVENTOR(S) : Martyn A. Lewis

It is certified that error appears in the above-identified patent and that said Letters Patent are hereby corrected as shown below:

Column 3, line 12, after "higher efficiencies" insert --associated--

Column 5, line 5, "entereing" should read --entering--.

Column 6, line 26, "Dent" should read --Detent--.

Column 16, line 39, after "step inward" "in" should read --to--; line 52, after "Counter is" insert --so--.

Column 19, line 23, after "different" delete "the". (Second occurrence).

Column 21, line 67, "be" should read --been--.

Column 24, line 32, "Trasducing" should read --Transducing--.

Columns 61-62, line 27, "subtarct" should read --subtract--.

UNITED STATES PATENT AND TRADEMARK OFFICE
CERTIFICATE OF CORRECTION

PATENT NO. : 4,751,441

DATED : June 14, 1988

INVENTOR(S) : Martyn A. Lewis

It is certified that error appears in the above-identified patent and that said Letters Patent are hereby corrected as shown below:

Columns 91-92, line 16, "POSITIONNING" should read "POSITIONING".

Columns 99-100, line 1, "DITECTION" should read "DIRECTION".

Columns 103-104, line 30, "subtarct" should read --subtract--. Line 38, "subtarct" should read --subtract--.

Columns 105-106, line 11, "subtarct" should read --subtract--.

Signed and Sealed this

Twenty-first Day of March, 1989

Attest:

DONALD J. QUIGG

Attesting Officer

Commissioner of Patents and Trademarks